United States Patent
Mortensen et al.

(10) Patent No.: US 11,986,804 B2
(45) Date of Patent: May 21, 2024

(54) CATALYST AND SYSTEM FOR METHANE STEAM REFORMING BY RESISTANCE HEATING; SAID CATALYST'S PREPARATION

(71) Applicants: HALDOR TOPSØE A/S, Kgs. Lyngby (DK); GRUNDFOS HOLDING A/S, Bjerringbro (DK)

(72) Inventors: Peter Mølgaard Mortensen, Roskilde (DK); Flemming Buus Bendixen, Hobro (DK); Peter Valler, Aalborg (DK); Alexandru Sorea, Aalborg Øst (DK)

(73) Assignees: HALDOR TOPSØE A/S, Kgs. Lyngby (DK); GRUNDFOS HOLDING A/S, Bjerringbro (DK)

( * ) Notice: Subject to any disclaimer, the term of this patent is extended or adjusted under 35 U.S.C. 154(b) by 773 days.

(21) Appl. No.: 17/059,901

(22) PCT Filed: May 15, 2019

(86) PCT No.: PCT/EP2019/062414
§ 371 (c)(1),
(2) Date: Nov. 30, 2020

(87) PCT Pub. No.: WO2019/228795
PCT Pub. Date: Dec. 5, 2019

(65) Prior Publication Data
US 2021/0121857 A1    Apr. 29, 2021

(30) Foreign Application Priority Data

May 31, 2018    (DK) .......................... PA 2018 00248

(51) Int. Cl.
*B01J 19/24*    (2006.01)
*B01J 12/00*    (2006.01)
(Continued)

(52) U.S. Cl.
CPC ........... *B01J 23/862* (2013.01); *B01J 12/007* (2013.01); *B01J 19/0013* (2013.01);
(Continued)

(58) Field of Classification Search
CPC .... B01J 23/862; B01J 12/007; B01J 19/0013; B01J 19/2485; B01J 21/10; B01J 35/33;
(Continued)

(56) References Cited

U.S. PATENT DOCUMENTS 5,296,198 A    3/1994    Abe et al.
2018/0148330 A1    5/2018    Tamhankar et al.

FOREIGN PATENT DOCUMENTS

DE    102013226126 A1    6/2015
WO    2017/036794 A1    3/2017
WO    2019/110268 A1    6/2019

OTHER PUBLICATIONS

Kramer Michelle et al: "Additive Manufacturing of Catalyst Substrates for Steam-Methane Reforming", Journal of Materials Engineering and Performance, ASM International, Materials Park, OH, US, vol. 27, No. 1, Aug. 22, 2017 (Aug. 22, 2017), pp. 21-31, XP036409289, ISSN: 1059-9495, DOI: 10.1007/11665-017-2859-4 [retrieved on Aug. 22, 2017].

(Continued)

*Primary Examiner* — Huy Tram Nguyen
(74) *Attorney, Agent, or Firm* — McGlew and Tuttle, P.C.

(57) ABSTRACT

The invention relates to a structured catalyst for catalyzing steam methane reforming reaction in a given temperature range T upon bringing a hydrocarbon feed gas into contact with the structured catalyst. The structured catalyst comprises a macroscopic structure, which comprises an electrically conductive material and supports a ceramic coating. The macroscopic structure has been manufactured by 3D printing or extrusion and subsequent sintering, wherein the
(Continued)

macroscopic structure and the ceramic coating have been sintered in an oxidizing atmosphere in order to form chemical bonds between the ceramic coating and the macroscopic structure. The ceramic coating supports catalytically active material arranged to catalyze the steam methane reforming reaction, wherein the macroscopic structure is arranged to conduct an electrical current to supply an energy flux to the steam methane reforming reaction. The invention moreover relates to methods of manufacturing the structured catalyst and a system using the structured catalyst.

23 Claims, 9 Drawing Sheets

(51) Int. Cl.
| | |
|---|---|
| B01J 19/00 | (2006.01) |
| B01J 21/10 | (2006.01) |
| B01J 23/86 | (2006.01) |
| B01J 35/33 | (2024.01) |
| B01J 35/50 | (2024.01) |
| B01J 35/56 | (2024.01) |
| B01J 37/00 | (2006.01) |
| B01J 37/02 | (2006.01) |
| B01J 37/08 | (2006.01) |
| B01J 37/14 | (2006.01) |
| B22F 10/18 | (2021.01) |
| B33Y 10/00 | (2015.01) |
| B33Y 40/20 | (2020.01) |
| B33Y 80/00 | (2015.01) |
| C01B 3/40 | (2006.01) |
| H05B 1/02 | (2006.01) |
| H05B 3/42 | (2006.01) |

(52) U.S. Cl.
CPC ........... *B01J 19/2485* (2013.01); *B01J 21/10* (2013.01); *B01J 35/33* (2024.01); *B01J 35/50* (2024.01); *B01J 35/56* (2024.01); *B01J 37/0018* (2013.01); *B01J 37/0205* (2013.01); *B01J 37/0207* (2013.01); *B01J 37/0225* (2013.01); *B01J 37/0228* (2013.01); *B01J 37/0242* (2013.01); *B01J 37/08* (2013.01); *B01J 37/14* (2013.01); *B22F 10/18* (2021.01); *B33Y 10/00* (2014.12); *B33Y 40/20* (2020.01); *B33Y 80/00* (2014.12); *C01B 3/40* (2013.01); *H05B 1/0247* (2013.01); *H05B 3/42* (2013.01); *B01J 2219/00135* (2013.01); *B22F 2301/35* (2013.01); *B22F 2302/25* (2013.01); *C01B 2203/0233* (2013.01); *C01B 2203/085* (2013.01); *C01B 2203/1023* (2013.01); *C01B 2203/1082* (2013.01); *C01B 2203/1241* (2013.01); *H05B 2203/016* (2013.01); *H05B 2203/017* (2013.01); *H05B 2203/022* (2013.01); *H05B 2214/03* (2013.01)

(58) Field of Classification Search
CPC ........ B01J 35/50; B01J 35/56; B01J 37/0018; B01J 37/0205; B01J 37/0207; B01J 37/0225; B01J 37/0228; B01J 37/0242; B01J 37/08; B01J 37/14; B01J 2219/00135; B01J 23/866; B01J 2219/2416; B01J 2523/00; B01J 15/005; B01J 23/002; B01J 23/78; B01J 35/40; B01J 35/60; B01J 37/0201; B01J 37/0217; B01J 37/0248; B01J 37/12; B22F 10/18; B22F 2301/35; B22F 2302/25; B33Y 10/00; B33Y 40/20; B33Y 80/00; C01B 3/40; C01B 2203/0233; C01B 2203/085; C01B 2203/1023; C01B 2203/1082; C01B 2203/1241; C01B 2203/1017; C01B 2203/1047; H05B 1/0247; H05B 3/42; H05B 2203/016; H05B 2203/017; H05B 2203/022; H05B 2214/03; H05B 2203/013; H05B 3/141; Y02P 10/25; Y02P 20/52; B29C 64/165
USPC ........................................................ 422/162
See application file for complete search history.

(56) References Cited

OTHER PUBLICATIONS

"1.1 Pellets and Traditional Steam-Methane Reforming Catalysts"; "1.2 Monoliths"; "1.3 Fabrication via Additive Manufacturing"; "4. Conclusions".
Liu Jinyun. "Engineering Materials Science" "Engineering Materials Science",Section 1, pp. 292-293, Harbin Institute of Technology Press, Nov. 30, 2016).
Han Zhicheng. "Electromagnetic Metallurgy Technology and Equipment". page 18 , Section 2.2.2, Metallurgical Industry Press, Jul. 31, 2008).
Zhu Xuejun. "Engineering Basics of Tactical Ballistic Missile Storage and Life Extension", p. 66 Section (2), China Aerospace Press, May 31, 2015).

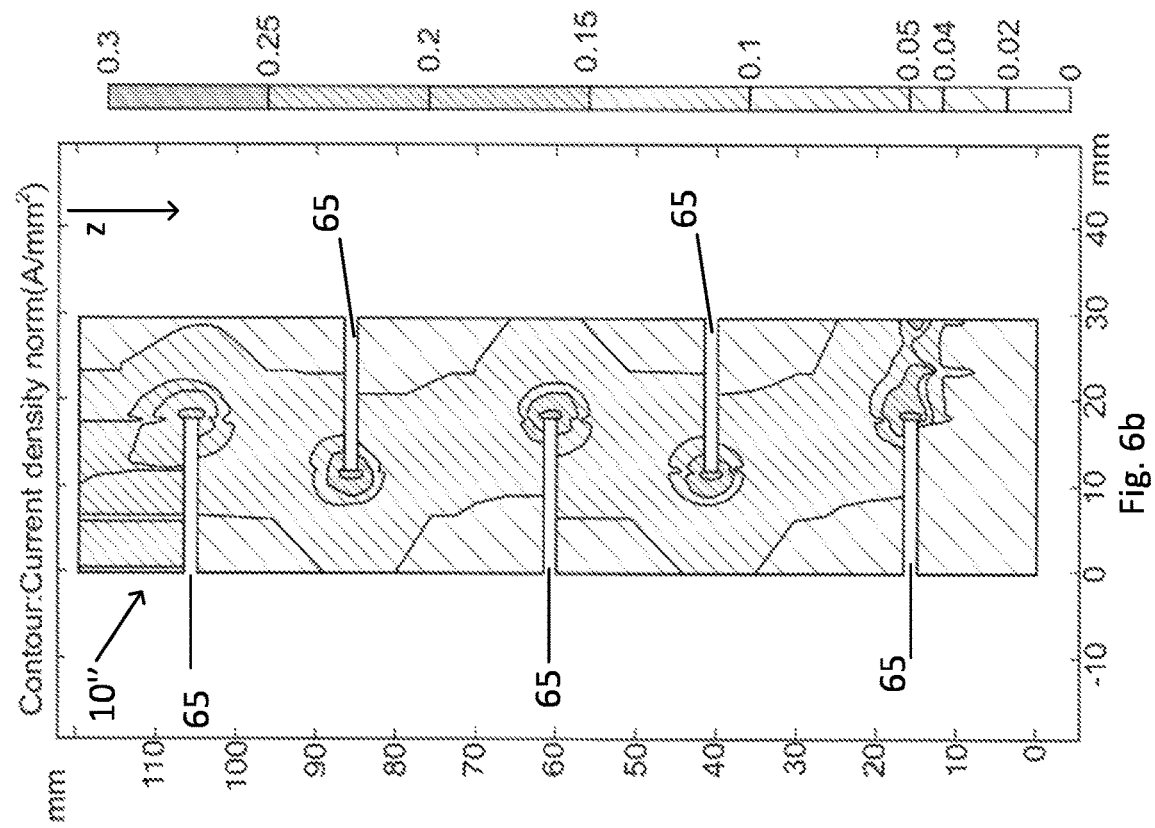
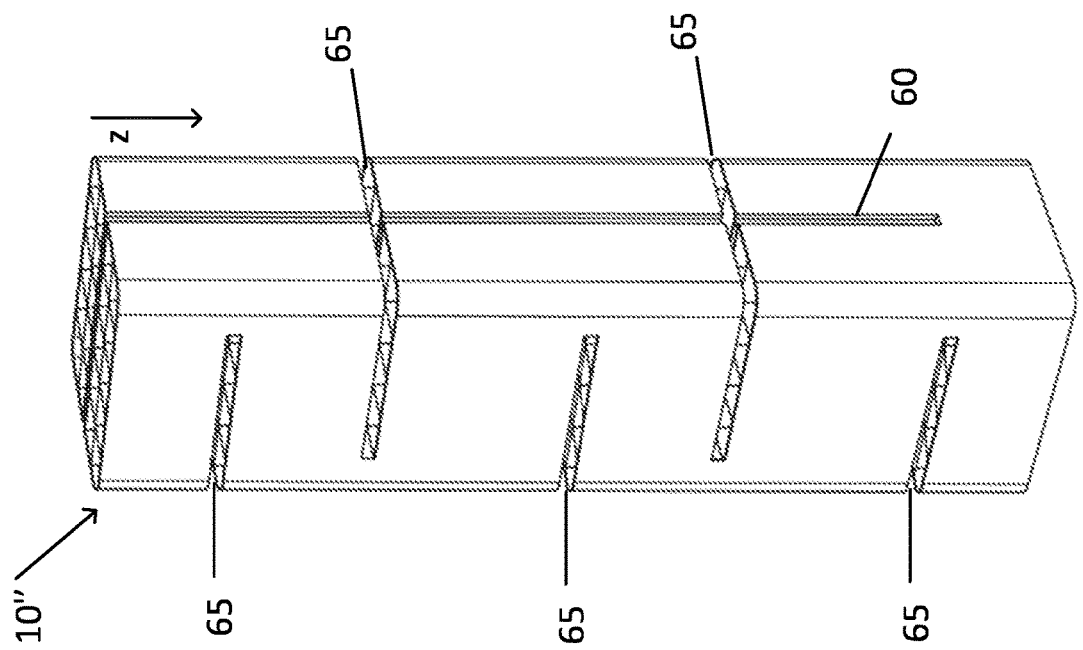
Fig. 6b
Fig. 6a

CATALYST AND SYSTEM FOR METHANE STEAM REFORMING BY RESISTANCE HEATING; SAID CATALYST'S PREPARATION

FIELD OF THE INVENTION

This invention relates to a structured catalyst for catalyzing steam methane reforming reaction by means of electrical resistance heating. The invention moreover relates to a method for manufacturing a structured catalyst and a system for carrying out a steam methane reforming reaction.

BACKGROUND OF THE INVENTION

Performing endothermic reactions, such as steam methane reforming, will often be challenged by how efficient heat can be transferred to the reactive zone of the catalyst bed within a reactor unit. Conventional heat transfers by convection, conduction and/or radiation can be slow and will often meet large heat resistance in many configurations. This challenge can be illustrated with the tubular reformer in a steam reforming plant, which practically can be considered as a large heat exchanger with heat transfer as the rate limiting step. One way to generate heat is by means of electrical resistance heating. DE102013226126 describes a process for allothermal methane reforming with physical energy reclamation, wherein methane is reformed by means of carbon dioxide into synthesis gas consisting of carbon monoxide and hydrogen. The starting gases $CH_4$ and $CO_2$ are processed in a fixed bed reactor consisting of electrically conductive and catalytic particles, which is electrically heated to temperatures of about 1000 K. The conversion of the reactant gases and the generation of heat of the generated synthesis gas take place in the fixed bed reactor.

It is desirable to provide a method for carrying out an endothermic catalytic chemical reaction and a system used in such a method by way of electrical resistance heating. It is also desirable to provide a catalyst for catalyzing steam methane reforming where heat is generated by means of electrical heating resistance, and where the distribution of current and thereby heat therein is uniform.

SUMMARY OF THE INVENTION

A first aspect of the invention relates to a structured catalyst for catalyzing the steam methane reforming reaction in a given temperature range T upon bringing a hydrocarbon feed gas into contact with the structured catalyst, where the structured catalyst comprising a macroscopic structure. The macroscopic structure comprises an electrically conductive material and the macroscopic structure supports a ceramic coating, where the macroscopic structure has been manufactured by extrusion or 3D printing, and by subsequent sintering. The macroscopic structure and the ceramic coating have been sintered in an oxidizing atmosphere in order to form chemical bonds between the ceramic coating and the macroscopic structure, where the ceramic coating supports catalytically active material arranged to catalyze the steam methane reforming reaction. The macroscopic structure is arranged to conduct an electrical current to supply energy to the chemical reaction.

When the structured catalyst within the system for catalyzing the steam methane reforming reaction comprises a macroscopic structure comprising catalytically active material, the catalytically active material is heated from the heating of the macroscopic structure upon subjecting the macroscopic structure to resistance heating by letting an electrical current flow through the macroscopic structure. The catalytically active material may thus be any appropriate active phase and any appropriate element.

The close contact between the catalytically active material and the macroscopic structures enables efficient heating of the catalytically active phase from thermal conduction within the material of the resistance heated macroscopic structure and the ceramic coating supported on the macroscopic structure. An important feature of the resistance heating process is thus that the heat is generated inside the object itself, instead of by an external heat source via heat conduction. Thus, the structured catalyst can be very rapidly heated.

The macroscopic structure is manufactured by extrusion or 3D printing, and by subsequent sintering. This/these process(es) give(s) a uniformly or nearly uniformly shaped macroscopic structure, which can afterwards be coated with the ceramic coating and impregnated with catalytically active material. The ceramic coating is coated onto those parts of the macroscopic structure, which are meant to be in contact with gas while the reactor unit housing the structured catalyst is in use. For example, the sintering may take place in vacuum or in a $H_2$ comprising atmosphere. The surface area of the macroscopic structure, the fraction of the macroscopic structure coated with a ceramic coating, the type and structure of the ceramic coating, and the amount and composition of the catalytically active catalyst material may be tailored to the steam reforming reaction at the given operating conditions. However, it should be noted, that advantageously substantially all the surface of the macroscopic structure is coated with the ceramic coating and preferably all or most of the ceramic coating supports the catalytically active material. Preferably, only the parts of the macroscopic coating which are connected to or are arranged to be connected to conductors, are not provided with the ceramic coating. The ceramic coating supporting the catalytically active material reduces or prevents the risk of carbon formation according to the reaction:

$$CH_4 \rightleftarrows C + 2H_2 \tag{A}$$

The coverage of the metallic structure with the ceramic coating supporting the catalytically active material ensures that the metallic phase of the macroscopic structure is covered by a coherent oxide layer, which has less potential for carbon forming reactions. Furthermore, the catalytically active material of the oxide phase will catalyze the steam reforming reactions and bring the reactant gas towards, or even close to, thermodynamic equilibrium. This increases the partial pressure of hydrogen and decreases the partial pressure of methane thereby reducing or in many cases eliminating the thermodynamic potential for carbon formation according to reaction (A) above.

Typically, the extruded or 3D printed macroscopic structure is manufactured coherently or cohesively in order to provide it with uniform geometric properties. This provides for a uniform distribution of current and thereby heat therein. When the macroscopic structure is extruded or 3D printed, the pressure drop from the inlet to the outlet of the reactor unit may be reduced considerably compared to when the catalyst material is in the form of pellets. Throughout this text, the term "coherent" is meant to be synonymous to cohesive and thus mean a material that is consistently intraconnected or consistently coupled.

By having a coherent extruded or 3D printed macroscopic structure with uniform geometric properties, it is possible to obtain uniform distribution of current in the macroscopic structure and thus uniform heat flux. In combination with having the macroscopic structure and the ceramic coating sintered in an oxidizing atmosphere in order to form chemical bonds between the ceramic coating and the macroscopic structure an especially high heat conduction between the electrically heated macroscopic structure and the catalytically active material supported by the ceramic coating is possible, offering close and nearly direct contact between the heat source and the active site. Thereby, the structured catalyst is compact in terms of gas processing per reactor unit volume, and a reactor unit housing the structured catalyst may be compact. At the same time, this offers immediate response to the heating of the process, making fast startup possible. When the macroscopic structure is extruded or 3D printed, the pressure drop from the inlet to the outlet of the reactor unit may be reduced considerably compared to when the catalyst material is in the form of pellets.

As used herein, the terms "3D print" and "3D printing" is meant to denote a metal additive manufacturing process. Such metal additive manufacturing processes cover 3D printing processes in which material is joined to a structure under computer control to create a three-dimensional object, where the structure is to be solidified, e.g. by sintering, to provide the macroscopic structure. Moreover, such metal additive manufacturing processes cover 3D printing processes which do not require subsequent sintering, such as powder bed fusion or direct energy deposition processes. Examples of such powder bed fusion or direct energy deposition processes are laser beam, electron beam or plasma 3D printing processes.

As used herein, the term "macroscopic structure" is meant to denote a macroscopic structure element in any appropriate form providing a high geometrical surface area. The material of the macroscopic structure may be porous or the macroscopic structure may be a solid. The word "macroscopic" in "macroscopic structure" is meant to specify that the structure is large enough to be visible with the naked eye, without magnifying devices. The dimensions of the macroscopic structure are typically in the range of tens of centimeters or of even meters. Two or more macroscopic structures may be connected in order to provide an array of macroscopic structures having at least one of the outer dimensions in the range of meters, such as 0.5 m, 1 m, 2 m or 5 m. Such two or more macroscopic structures may be denoted "an array of macroscopic structures".

Non-limiting examples of macroscopic structures are e.g. monoliths. Two types of macroscopic structures are particularly suitable for the inventive process: the straight-channeled elements and the cross-corrugated elements. Various geometries of these elements are conceivable.

The outer dimensions of the macroscopic structure are typically in the range of cm or meters, such as from 50 cm to some meters. Dimensions of the macroscopic structure are advantageously made to correspond at least partly to the inner dimensions of a reactor unit housing the structured catalyst. Two or more macroscopic structures may be connected in order to provide a structured catalyst having at least one of the outer dimensions in the range of meters, such as a length or area equivalent diameter of 5 m. Conceivable macroscopic structures could take up a reactor unit volume of 1 to 10 m$^3$ or even larger. As used herein, the area equivalent diameter of the cross section through the reactor unit is the diameter of a circle of equivalent area as the area of the cross section.

The macroscopic structure comprises an electrically conductive material and is designed in order to allow an electrical current to run through the macroscopic structure. Thus, advantageously most of, or all of, the material of the macroscopic structure is electrically conductive. A material with an appropriate conductivity should be chosen so that an electrical current may run through the macroscopic structure whilst heating up the macroscopic structure. The material of the macroscopic structure is for example a metallic material. Moreover, the macroscopic structure is advantageously a coherent or consistently interconnected material in order to achieve electrical conductivity throughout the structured catalyst.

Catalytic material may be added directly to a metal surface by wash coating. The wash coating of a metal surface is a well-known process; a description is given in e.g. Cybulski, A., and Moulijn, J. A., Structured catalysts and reactors, Marcel Dekker, Inc, New York, 1998, Chapter 3, and references herein.

The amount of catalytically active material can be tailored to the required catalytic activity for the chemical reaction, e.g. steam reforming reactions, at the given operating conditions. In this manner the pressure drop is lower and the amount of catalyst is not more than needed which is especially an advantage if costly noble metals are used.

In more conventional applications with reformer tubes with pellets, the steam reforming reactors are often designed to maximize heat transfer and pellets are simply placed in channels where the process gas flows often result in a vast excess of catalytic activity. In relation to conventional steam methane reformers with tubes with catalyst pellets, it is generally recognized that the ratio of the reformer tube diameter to the diameter of catalyst pellets should be above 4-5 to ensure a good packing of catalyst pellets. This provides for constraints on the tube geometry in that unwanted or excess pressure drops through the tubes are to be avoided; thus, the reformer tubes need to have a certain diameter corresponding to at least 4-5 times the diameter of catalyst pellets. With a structured catalyst comprising a macroscopic structure this constraint is eliminated, opening the possibility for more compact reformers.

The structured catalyst of this invention is arranged for generating heat by resistance heating uniformly over its geometric surface area, whereby the temperature profile of the structured catalyst may be controlled. Thus it is possible to ensure that the temperature of the hydrocarbon feed gas does not increase faster than the rate of reaction can follow. Hereby, it is avoided to exposing unconverted hydrocarbons to high temperatures and thus a thermodynamic carbon formation from the gas may be avoided.

In an embodiment, the material of the macroscopic structure comprises iron, chromium, aluminum, cobalt, or an alloy thereof. For example, the material of the macroscopic structure is an alloy comprising iron and chromium, an alloy comprising iron, chromium and aluminum, an alloy comprising iron and cobalt, or an alloy comprising iron, aluminum, nickel, and cobalt. "Alnico alloys" are a specific type of alloys comprising iron, aluminum, nickel, and cobalt, and maybe also copper, titanium and other elements, whilst FeCrAlloys comprises iron, chromium and aluminum. In our tests, the alloy Kanthal has proven to be a good choice of material for the macroscopic structure due to its resistive properties.

The term "an alloy comprising X and Y" is meant to denote an alloy which has X and Y as major components and possibly comprising further elements. Iron and its alloys respond very well to resistance heating, due to their nature.

In an embodiment, the macroscopic structure comprises a plurality of parallel channels. Thereby, the surface area of the macroscopic structure with catalytically active material exposed to the gas is as large as possible.

Moreover, when the macroscopic structure has parallel channels, these parallel channels render a structured catalyst with a very small pressure drop. In a preferred embodiment parallel longitudinal channels are skewed in the longitudinal direction of the macroscopic structure. In this way molecules of the hydrocarbon feed gas flowing through the macroscopic structure will mostly tend to hit an active catalytic wall inside the channels instead of just flowing straight through a channel without being in contact with a wall.

In an embodiment, the resistivity of the macroscopic structure is between $10^{-5}$ Ω·m and $10^{-7}$ Ω·m. Such a resistivity provides for a macroscopic structure with sufficient heat flux possible for the steam methane reforming reaction.

In an embodiment, the ceramic coating is an oxide comprising aluminum, zirconium, magnesium, cerium, calcium, lanthanum, yttrium, or a combination of at least two of these oxides. The oxide may e.g. $AlZrCeO_x$. The oxide may additionally comprise silicon and/or titanium.

In an embodiment, the macroscopic structure has a plurality of near-parallel or parallel channels, a plurality of non-parallel channels and/or a plurality of labyrinthic channels, where the channels have walls defining the channels. Thereby, several different forms of the macroscopic structure can be used as long as the surface area of the structured catalyst exposed to the gas is as large as possible. In a preferred embodiment, the macroscopic structure has parallel channels, since such parallel channels render a structured catalyst with a very small pressure drop. In a preferred embodiment, parallel longitudinal channels are skewed in the longitudinal direction of the macroscopic structure. In this way, molecules of the gas flowing through the macroscopic structure will mostly tend to hit a wall inside the channels instead of just flowing straight through a channel without being in contact with a wall. The dimension of the channels should be appropriate in order to provide a macroscopic structure with a sufficient resistivity. For ex-ample, the channels could be quadratic (as seen in cross section perpendicular to the channels) and have a side length of the squares of between 1 and 3 mm; however, channels having a maximum extent in the cross section of up to about 4 cm are conceivable. Moreover, the thickness of the walls should be small enough to provide a relatively large electrical resistance and large enough to provide sufficient mechanical strength. The walls may e.g. have a thickness of between 0.2 and 2 mm, such as about 0.5 mm, and the ceramic coating supported by the walls has a thickness of between 10 μm and 500 μm, such as between 50 μm and 200 μm, such as 100 μm. It should be noted that the channels do not have to be constant cross-section along the length of the macroscopic structure. Thus, the channels could have uniform or varying cross-sections along the length of the macroscopic structure.

An example of the dimensions of the walls defining the channels and the ceramic coating coated onto the walls is that the walls have a thickness of between 0.2 and 2 mm, such as of about 0.5 mm, and that the ceramic coating supported by the walls has a thickness of between 50 μm and 200 μm, such as about 100 μm.

In an embodiment, the catalytically active material comprise nickel, ruthenium, rhodium, cobalt, iridium, or a combination of at least two of these elements. Thus, one possible catalytically active material is a combination of nickel and rhodium and another combination of nickel and iridium. Preferably, the macroscopic structure comprises Fe, Cr, Al, Ni, or an alloy thereof. Such an alloy may comprise further elements, such as Si, Mn, Y, Zr, C, Co or combinations thereof. The ceramic coating may for example be an oxide comprising Al, Zr, Mg, Ce and/or Ca. Exemplary coatings are calcium aluminate or a magnesium aluminum spinel. Such a ceramic coating may comprise further elements, such as La, Y, Ti, K, or combinations thereof. Preferably, the conductors and the macroscopic structure are made of different materials than the macroscopic structure. The conductors may for example be of iron, nickel, aluminum, copper, silver, or an alloy thereof. The ceramic coating is an electrically insulating material and will typically have a thickness in the range of around 100 μm, e.g. about 10-500 μm.

In an embodiment, the catalytically active material are sub-micron sized particles. Advantageously, the size of these catalytically active particles is in the range from about 3 nm to about 250 nm In an embodiment, the macroscopic structure has at least one electrically insulating part arranged to provide a principal current path within the macroscopic structure having a length larger than the largest dimension of the macroscopic structure. Such electrically insulating parts are arranged to increase the current path within the macroscopic structure and thus increase the resistance through the macroscopic structure. Non-limiting examples of such electrically insulating parts are cuts, slits, or holes in the macroscopic structure. Such cuts, slits or holes in the macroscopic structure may be created by post-processing of the macroscopic structure, e.g. by drilling, cutting or otherwise removing some of the macroscopic structure, or may be formed during the manufacture of the macroscopic structure, such as during the 3D-printing or prior to the sintering process step Optionally, a solid, electrically insulating material such as glass, provided in cuts or slits in the macroscopic structure can be used. A solid, electrically insulating material within a cut or slit assists in keeping the parts of the macroscopic structure on the sides of the cut or slit from each other. A cut, slit or hole may be provided in the macroscopic structure by cutting or drilling into the macroscopic structure or otherwise removing some material from the macroscopic structure. Alternatively, a cut, slit or hole may be formed if the macroscopic structure is made up of a number of macroscopic structures combined together in a shape so that a cut, slit or hole appears within the macroscopic structure. Alternatively, an electrically insulating part may be formed if the macroscopic structure is made up of a number of macroscopic structures and intermediate ceramic elements combined together in a shape so that ceramic layer is in between the principal surfaces of two or more macroscopic structures and the macroscopic structures only are combined together in a confined area.

The ceramic coating can be an oxide comprising aluminum, zirconium, magnesium, cerium, calcium, lanthanum, and/or yttrium.

As used herein, the term "largest dimension of the macroscopic structure" is meant to denote the largest inner dimension of the geometrical form taken up by the macroscopic structure. If the macroscopic structure is box-formed, the largest dimension would be the diagonal from one corner to the farthest corner, also denoted the space diagonal.

In an embodiment, the resistance and geometry of the material of the macroscopic structure is configured to have a heat generation capacity of 500 to 50000 $W/m^2$.

In an embodiment, the material of the macroscopic structure has a porosity in the range from 0 to 60%. In this context, porosity is defined as the volume taken up by void in material, viz. the walls, of the macroscopic structure relative to the total volume occupied by the walls. Thus, the porosity of the macroscopic structure does not take the void within the channels of the macroscopic structure, into account.

Another aspect of the invention relates to a structured catalyst that comprises two or more macroscopic structures. The two or more macroscopic structures are advantageously electrically connected to each other.

Another aspect of the invention relates to a method for manufacturing a structured catalyst according to the invention. The method comprises the steps of:
 a) mixing powdered metallic particles with a binder to a mixture,
 b) extruding the mixture to an extruded structure,
 c) sintering the extruded structure in a non-oxidizing atmosphere at a first temperature $T_1$, where $T_1 > 1000°$ C., thereby providing a macroscopic structure,
 d) applying a ceramic coating onto the macroscopic structure,
 e) sintering the macroscopic structure and the ceramic coating in an oxidizing atmosphere, at a second temperature $T_2$, where $T_2 > 800°$ C., and
 f) impregnating the ceramic coating with catalytically active material.

According to yet another aspect, the invention relates to a method for manufacturing a structured catalyst according to the invention. The method comprises the steps of:
 a) mixing powdered metallic particles with a binder to a mixture,
 b) extruding said mixture to a structure,
 c) sintering said extruded structure in a non-oxidizing atmosphere at a first temperature $T_1$, where $T_1 > 1000°$ C., thereby providing a macroscopic structure,
 d) providing a ceramic coating onto the macroscopic structure, wherein the ceramic coating supports catalytically active material, and
 e) sintering the macroscopic structure and the ceramic coating in an oxidizing atmosphere, at a second temperature $T_2$, where $T_2 > 800°$ C., in order to form chemical bonds between said ceramic coating and said macroscopic structure.

This method for manufacturing the structured catalyst differs from the former method for manufacturing the structured catalyst by the fact that in step d) the ceramic coating which is provided onto the macroscopic structure already contains catalytically active material. Thus, the catalytically active material may be mixed into the material of the ceramic coating prior to providing the ceramic coating onto the macroscopic structure. Otherwise, the catalytically active material is provided by impregnating the macroscopic structure, immersing the macroscopic structure into a slurry comprising the catalytically active material or otherwise loading the catalytically active material onto the macroscopic structure.

An exemplary sintering temperature for step c) may be about 1050° C.

The non-oxidizing atmosphere used in step c) is a reducing atmosphere or an inert atmosphere. The term "reducing atmosphere" is meant to denote an atmosphere containing more reducing gas molecules than oxidizing gas molecules, such as more $H_2$ than $O_2$ and/or more $H_2$ than $H_2O$.

According to yet another aspect, the invention relates to a method for manufacturing a structured catalyst according to the invention. The method comprises the steps of:
 a) 3D printing the macroscopic structure with a metal additive manufacturing melting process,
 b) applying a ceramic coating onto the macroscopic structure,
 c) sintering the macroscopic structure and the ceramic coating in an oxidizing atmosphere, at a second temperature $T_2$, where $T_2 > 800°$ C., and
 d) impregnating the ceramic coating with catalytically active material, thereby providing the structured catalyst.

According to yet another aspect, the invention relates to another method for manufacturing a structured catalyst according to the invention. The method comprises the steps of:
 a) 3D printing a metal structure with a binder-based metal additive manufacturing process,
 b) sintering the metal structure in a non-oxidizing atmosphere at a first temperature $T_1$, where $T_1 > 1000°$ C., thereby providing a macroscopic structure,
 c) applying a ceramic coating onto the macroscopic structure,
 d) sintering the macroscopic structure and the ceramic coating in an oxidizing atmosphere, at a second temperature $T_2$, where $T_2 > 800°$ C., and
 e) impregnating the ceramic coating with catalytically active material, thereby providing the structured catalyst.

The latter method for manufacturing the structured catalyst differs from the former method for manufacturing the structured catalyst in that the structure is created and subsequently sintered in a separate step, when the metal structure is 3D printed with a binder-based metal additive. When the metal structure is 3D printed by a metal additive manufacturing step, the structure is also sintered, but this is typically carried out along with the creation of the 3D structure. For example, a layer of metal material is deposited, sintered, and these two steps are repeated until the 3D structure has been created.

Both sintering, extruding, and 3D-printing give a uniformly and coherently shaped macroscopic structure, which can afterwards be coated with the catalytically active material. Typically, the catalytically active material is coated onto those parts of the macroscopic structure which will be in contact with gas while the structured catalyst is in use.

When the extruded or 3D printed structure and the ceramic coating have been sintered in an oxidizing atmosphere in order to form chemical bonds between the ceramic coating and the macroscopic structure, it is possible to obtain an especially high heat conduction between the macroscopic structure and the catalytically active material supported by the ceramic coating. Thereby, the structured catalyst is compact in terms of heat transfer to the active site, and a reactor unit housing the structured catalyst may be compact and only limited by the rate of the chemical reaction.

A binder or a binding agent is any material or substance that holds or draws other materials together to form a cohesive whole mechanically, chemically, by adhesion or cohesion. The binders could be, but are not limited to, photopolymers, thermoplastics, or cellulose ethers. Examples of binders are: methylcellulose, polyoxymethylene, poly(ethylene oxide), poly(vinyl alcohol), sodium carboxymethylcellulose (cellulose gum), alginates, ethyl cellulose and pitch.

Another aspect of the invention relates to a system for carrying out a steam methane reforming reaction in a given temperature range T upon bringing a hydrocarbon feed gas into contact with a structured catalyst according to the invention. The system comprises a reactor unit comprising the structured catalyst and at least two conductors electrically connected to the structured catalyst, and an electrical power supply arranged for connecting the structured catalyst to at least two conductors in order to allow an electrical current to run through the structured catalyst during operation of the reactor unit.

Typically, in operation, a gas flows through the reactor unit in an upflow or downflow direction, so that the gas flows through channels in the structured catalyst along the length thereof. When the catalyst material houses an array or a plurality of macroscopic structures, the individual macroscopic structures may be placed side by side, on top of each other or in a combination thereof.

A technical advantage of this system is the low consumption of energy needed for heating as compared with the prior art as no excess heating of flue gasses and similar occurs. Another advantage is that the system may be compact due to the effective heat transfer between the macroscopic structure and the catalytically active material. The heating processes known until now are ineffective and have a low efficiency. A further advantage is that the system of the invention is simple to realize because of the relatively few components that are needed in the system. The conductors of the reactor unit each comprises at least one contact point for electrical contact between the conductor and an electrical wire or electrical connector, so that the electrical wire or electrical connector may connect the power supply and the reactor unit electrically.

Another advantage of the system of the invention is that the flow through the structured catalyst may be up-flow when the structured catalyst is a structured catalyst. This is more difficult in the case of pellets due to the risk of fluidization. Thereby, a substantial degree of piping may be avoided reducing plant cost.

The system typically comprises further elements, known to the skilled person, such as means for ensuring a gas tight reactor unit.

In an embodiment of the system, the conductors and the macroscopic structure are made of different materials.

In an embodiment, the connection between the macroscopic structure of the structured catalyst and the at least two conductors is a mechanical connection, a welded connection, a brazed connection or a combination of these connections. A mechanical connection is e.g. a press fit connection or a threaded connection.

In an embodiment, the conductors are preferably made in one of the following elements: iron, nickel, aluminum, copper, chromium or an alloy of these elements. As an example, the conductors are of copper, an alloy of copper, nickel, an alloy of nickel or of a FeCrAlloy type alloy. The conductors can be completely or partly of the same material as the macroscopic structure. Alternatively, the conductors can be of a different material.

In an embodiment the hydrocarbon feed gas enters into the structured catalyst at a first end and a product gas exits the structured catalyst at a second end, wherein the at least two conductors are connected to the structured catalyst at a position closer to the first end than to the second end. The term "first end of the structured catalyst" is meant to denote the end of the structured catalyst where the feed gas enters the structured catalyst, and the term "second end of the structured catalyst" is meant to denote the end of the structured catalyst from which the gas exits the structured catalyst. Moreover, it should be noted that the term "the at least two conductors are connected to the structured catalyst at a position on the structured catalyst closer to the first end of the structured catalyst than to the second end of the structured catalyst" is meant to denote that both/all of the at least two conductors are connected closer to the first end of the structured catalyst than to the second end. Preferably, the at least two conductors are connected to first end of the structured catalyst or within the quarter of the length of the/a macroscopic structure closest to the first end.

When the pressure shell comprises an inlet for letting in process gas and an outlet for letting out product gas, where the inlet is positioned so that the feed gas enters the structured catalyst in a first end of the structured catalyst and the product gas exits the structured catalyst from a second end of the structured catalyst, and when the at least two conductors both are connected to the structured catalyst at a position on the structured catalyst closer to the inlet than to the outlet, the at least two conductors can be placed in the relatively colder part of the reactor unit of the system. The first end of the structured catalyst has a lower temperature than the second end of the structured catalyst due to:

the feed gas fed led through the inlet may cool the at least two conductors before being heated by the structured catalyst further along the path of the gas through the structured catalyst;

the inlet feed gas inlet into the first end of the structured catalyst will have lower temperature than the product gas leaving the second end of the structured catalyst, due to the heat supplied to the structured catalyst electrically, the endothermic nature of the steam reforming reaction absorbs heat, the structured catalyst is constructed to direct an electrical current to run from one conductor substantially to the second end of the structured catalyst and return to a second of the at least two conductors.

Therefore, the temperature profile in of the structured catalyst will correspond to a substantially continuously increasing temperature along the path of the feed gas through the structured catalyst. This corresponds to a substantially increasing conversion rate of methane in the feed gas to hydrogen and carbon monoxide.

Hereby, the current is led into the macroscopic structure and out from the macroscopic structure through electrodes positioned in the relatively cold first end thereof. It is an advantage that the temperature of all electrically conducting elements except the macroscopic structure is kept down in order to protect the connections between the conductors and the structured catalyst. When the temperature of the conductors and other electrically conducting elements, except the macroscopic structure, is relatively low, less limitations on materials suitable for the conductors and other electrically conducting elements, except the macroscopic structure, exists. When the temperature of the electrically conducting elements increase, the resistivity thereof increases; therefore, it is desirable to avoid unnecessary heating of all other parts than the macroscopic structures within the reactor unit of the system.

It should be noted that the term "electrically conducting elements, except the macroscopic structure" is meant to cover the relevant electrically conducting elements arranged to connect the power supply to the structured catalyst and potential connections in between macroscopic structures or structured catalyst.

The combination of the substantially continuously increasing temperature profile of the structured catalyst along the path of the feed gas through the structured catalyst and a controllable heat flux from the structured catalyst, control of the reaction front of the chemical reaction is achievable.

In an embodiment, the system comprises a control system arranged to control one or more of the following: the electrical current, the voltage, the heat flux, the space velocity, or combinations thereof. Hereby, it is possible to control the energy flux from the structured catalyst to the heat of reaction of the steam methane reaction, so that the structured catalyst provides sufficient heat to enable fast heating within a limited approach to equilibrium. Hereby, it is possible to control the heat flux of the structured catalyst and match this directly to the heat of reaction and thus to the kinetic performance of the catalytically active material thereof. The term "the energy is matched to the heat of reaction" is meant to denote that the heat flux provided by the macroscopic structure is sufficient to enable fast heating within a limit close to the equilibrium of reaction, viz. within a temperature of about ±30° of the equilibrium temperature of the methane reforming reaction. This means that it is possible to provide further heat by resistance heating of the macroscopic structure until the chemical reaction cannot use more energy/heat. Thus, it is possible to adapt the heat flux of the macroscopic structure to the required heat of reaction of the steam methane reforming reaction.

In an embodiment, the height of the structured catalyst or the reactor unit is less than 5 meters. The height of the structured catalyst may be even smaller than 5 meters, such as less than 2 meters or even 1 meter. The overall dimensions of the structured catalyst within the reactor unit may provide for a relatively tall and thin reactor unit or a small and wide reactor unit. Overall, a compact reactor unit is possible due to the structured catalyst having effective heat transfer directly to the catalytically active material. It is moreover to be noted, that the dimensions of the structured catalyst may be chosen relatively freely, so that the structured catalyst may be almost cubic in outer shape or it may be wider than its height. The reactor unit volume is closely related to the volume of the structured catalyst. The structured catalyst may e.g. have outer dimensions of 2 meter times 1 meter times 1 meter, corresponding to a volume of 2 cubic meters. Many other appropriate dimensions are possible; however, typically the volume of the structured catalyst is in the order of some cubic meters, typically less than 10 or 15 cubic meters. The space velocity of gas, evaluated as flow of gas relative to the geometric surface area of the structured catalyst, is typically between 0.6 and 60 $Nm^3/m^2/h$, such as between 3 and 17 $Nm^3/m^2/h$, or such as between 9 and 14 $Nm^3/m^2/h$. Given relative to the occupied volume of the structured catalyst, the space velocity is between 700 $Nm^3/m^3/h$ and 70000 $Nm^3/m^3/h$, such as between 3500 $Nm^3/m^3/h$ and 20000 $Nm^3/m^2/h$, or such as between 11000 $Nm^3/m^3/h$ and 16000 $Nm^3/m^3/h$. Given as a space velocity relative to the volume of active catalyst, i.e. the volume of the ceramic coat, it is between 6000 $Nm^3/m^3/h$ and 1200000 $Nm^3/m^3/h$. Operating within these ranges of the space velocity allows for a desired conversion. It should be noted, that the space velocity of the gas is meant to denote the space velocity of the gas entering the reactor system, viz. both the feed gas and the cooling gas.

When the reactor unit is compact, the amount of outside piping to the reactor unit may be reduced compared to a conventional steam methane reformer, thus reducing the amount of material and thereby the cost of such piping is reduced. This is in contrast to conventional steam methane reformers, typically having a plurality of tubes within a fired furnace, the tubes having an internal diameter of about 10 cm and a length of about 13 meters. Moreover, it is an advantage that the amount of synthesis gas produced in a single reactor unit pressure shell of the system is increased considerably compared to the amount of synthesis gas produced by a single tube in known tubular steam reformers. In a standard tubular steam reformer, the amount of synthesis gas produced in a single tube of the tubular steam reformer is up to 500 $Nm^3/h$. In comparison, the reactor unit of the system of the invention is arranged to produce up to or more than 2000 $Nm^3/h$, e.g. even up to or more than 10000 $Nm^3/h$, within a single reactor unit or pressure shell. This can be done without the presence of $O_2$ in the feed gas and with less than 10% methane in the synthesis gas produced. When a single reactor unit or pressure shell houses catalyst for producing up to 10000 $Nm^3/h$ synthesis gas, it is no longer necessary to provide a plurality of pressure shells or means for distributing feed gas to a plurality of such separate pressure shells.

As used in this paragraph, the volume of the structured catalyst is calculated as the volume of box or other appropriate figure having similar outer dimensions as the catalyst. This volume is different from the inner volume of the structured catalyst, since the inner volume thereof is calculated as the volume within the channels or walls of the structured catalyst. As used herein, the term "structured catalyst" covers the case where a single extruded or 3D printed, structured catalyst in the form a one extruded or 3D printed macroscopic structure with ceramic coating and catalytically active material is housed within the reactor unit as well as the case where the structured catalyst comprises two or more macroscopic structures housed in the reactor unit; such two or more extruded or 3D printed macroscopic structures support ceramic coating which in turn supports catalytically active material.

In an embodiment, the conductors are surrounding the macroscopic structure. Typically, the conductors have a shape similar to the shape of the macroscopic structure. This ensures a good electrical connection and a good distribution of the electrical current through the macroscopic structure. The conductor could e.g. be a closed ring in the case when the macroscopic structure has a circular external shape, extending a full circle or 360 mechanical degrees. In the middle of the ring there is an opening allowing the hydrocarbon feed gas to enter the macroscopic structure. Thus, in one embodiment the inner diameter of the opening of the ring essentially corresponds to the diameter of the macroscopic structure.

In an embodiment, the macroscopic structure is a longitudinal structure comprising a conductor at each end of the longitudinal structure. The conductors are preferably shaped as current distributors ensuring that the electrical current is equally distributed across the macroscopic structure. The conductors acting as electrical distributors are in physical and electrical contact with the longitudinal structure. In the case where the macroscopic structure comprises a plurality of parallel, the conductors are in physical and electrical contact with the ends of one or more of the channels.

As shown in the figures, the gas flow through the structured catalyst is axial or co-axial with the length or z-axis of the structured catalyst. Even though the figures show that the z-axis of the structured catalyst is vertical, it should be noted that the reactor can be positioned in any suitable way, so that the structured catalyst and the gas flow through it can e.g. be horizontal, upside down compared to the figures, or angled at e.g in 45° to horizontal. The conductors have connection points for allowing connection of an electrical wire to the conductor, so that the conductors may be connected to the power supply. It has been shown that the position of the connection points of the two conductors of the system may influence the current distribution within the macroscopic structure. For example, in a case where the macroscopic structure is a longitudinal structure with a ring shaped conductor at each of its two ends, it is advantageous that the connection points of the two conductors are turned 180 degrees in relation to each other. Other measures may be taken in order to increase the path of the current within the structured catalyst. One example could be to provide two conductors in one end of the structured catalyst and centrally and axially providing an insolation inside the macroscopic structure, except from the end opposite the end with the conductors, thereby forcing the current to flow from the first conductor throughout the length of the structured catalyst and back throughout the length of the catalyst to the other conductor.

In an embodiment, the structured catalyst is heated to a temperature within the given temperature range T. The given temperature range T is the range between about 200° C. and about 1050° C. or a sub-range thereof. Thus, the outlet temperature of the gas exiting the reactor unit may be up to about 1050° C.

In an embodiment of the reactors system, the structured catalyst is constructed to direct an electrical current to run from one conductor substantially to the second end of the structured catalyst and return to a second of the at least two conductors. In an embodiment of the system, the structured catalyst has electrically insulating parts arranged to increase the length of a principal current path between said at least two conductors to a length larger than the largest dimension of the structured catalyst. Such electrically insulating parts are arranged to increase the current path and thus increase the resistance through the structured catalyst. Hereby, the current path through the structured catalyst can be e.g. more than 50%, 100%, 200%, 1000% or even 10000% longer than the largest dimension of the structured catalyst. As elucidated above, this assists in ensuring that the temperature profile of the structured catalyst will correspond to a substantially continuously increasing temperature along the path of a feed gas through the structured catalyst.

Moreover, such electrically insulating parts are arranged to direct the current from one conductor, which is closer to the first end of the structured catalyst than to the second end, towards the second end of the structured catalyst and back to a second conductor closer to the first end of the structured catalyst than to the second end. Preferably, the current is arranged to run from the first end of the structured catalyst to the second and back to the first end. As seen in the figures, the first end of the structured catalyst is the top end thereof. The arrow indicated "z" in FIGS. 1-4 and 6a indicates a z-axis along the length of the structured catalyst. The principal current path throughout the structured catalyst will have a positive or negative value of z-coordinate of the accompanied current density vector along most of the length of the current path. By principal current path is meant the path of the electrons through a macroscopic structure of the structured catalyst with the highest current density. The principal current path can also be understood as the path having the minimum electrical length through the macroscopic structure of the structured catalyst. The current flow is governed by Ohm's law in the electrical conductive structure. Seen geometrically, the principal current path can be quantified as the largest current density vector within a plane perpendicular to the gas flow direction of a coherent section of the macroscopic structure. At the bottom of the structured catalyst, as shown in the figures, the current will turn, and here the z-coordinate of the accompanied current density vector will be zero.

In an embodiment of the system, the structured catalyst has electrically insulating parts arranged to direct a current through the structured catalyst in order to ensure that for at least 70% of the length of the structured catalyst, a current density vector of the a principal current path has a non-zero component value parallel to the length of the structured catalyst. Thus, for at least 70% of the length of the structured catalyst, the current density vector will have a positive or negative component value parallel to the length of the structured catalyst. Thus, for at least 70%, e.g. for 90% or 95%, of the length of structured catalyst, viz. along the z-axis of the structured catalyst as seen in FIG. 1-5 or 6a, the current density vector of a principal current path will have a positive or negative value along the z-axis. This means that the current is forced from the first end of the structured catalyst towards the second end, and subsequently is forced towards the first end again. The temperature of the gas entering the first end of the structured catalyst and the endothermic steam reforming reaction taking place over the structured catalyst absorbs heat from the structured catalyst. For this reason, the first end of the structured catalyst remains colder than the second end, and by ensuring that the current density vector of the principal current path has a non-zero component value parallel to the length of said structured catalyst, this takes place with a substantially continuously increasing temperature profile, which gives a controllable reaction front. In an embodiment the current density vector has a non-zero component value parallel to the length of said structured catalyst in 70% of the length of said structured catalyst, preferably 80%, more preferably 90%, and even more preferably 95%. It should be noted that the term "the length of the structured catalyst" is meant to denote the dimension of the structured catalyst in the direction of the gas flow in the reactor unit housing the structured catalyst. In the structured catalysts as shown in the figures, the length is the longitudinal direction, viz. the longest dimension thereof. This is indicated by the arrow denote z in some of the figures.

A power supply is used for supplying electrical current to the macroscopic structure. By way of example the electrical current can be a direct current, an alternating current, or a pulsed current. By the process of the invention the structured catalyst is heated by resistance heating. This provides the heat necessary for the steam methane reforming reaction. The heating of the hydrocarbon feed gas is provided by conduction when the hydrocarbon feed gas is brought into contact with the structured catalyst, typically by being adsorbed onto the surface of the structured catalyst, as well as by convection prior to the hydrocarbon feed gas contacting the surface of the structured catalyst. The catalytic chemical reaction of the hydrocarbon feed gas within the reactor unit results in a product gas, which is let out from the reactor unit, possibly for further processing.

In an embodiment, the energy transferred to the macroscopic structure is in the range from 1 to 50 kW/m$^2$. These numbers are only exemplary and depends upon the dimensions of the structured catalyst. However, industrially available currents, voltages and frequencies will typically be sufficient to heat the structured catalyst. If alternative current is used, suitable frequencies could be in the range 50-60 Hz. The voltage between the at least two electrodes can be any appropriate voltage arranged to provide the desired heat flux. If the voltage is too low, the heat flux may become too low, and if the voltage is too high, the risk of electric arcs is increased. Exemplary values are e.g. a voltage between 50 and 4000 V, such as between 100 and 1000 V. Such values will render the compactness of the macroscopic structure and thus of the reactor unit of the system possible. Moreover, the current running between electrodes through the macroscopic structure can be any appropriate current, which together with the chosen voltage will provide the desired heat flux. The current may e.g. be between 100 and 2000 A, such as between 200 and 1500 A.

In an embodiment, the given temperature range T is the range between about 200° C. and about 1050° C. In a preferred embodiment, the given temperature range T is the range between about 400° C. and about 1050° C. This temperature range is meant to denote the maximum temperatures experienced by the hydrocarbon feed gas and/or product gas within a reactor unit housing the structured catalyst, and thus the temperature range is also meant to cover the temperature of the product gas exiting the reactor unit. Typically, the outlet temperature of the product gas lies in the range from 600° C. to about 1050° C. In an embodiment, the design pressure of the reactor unit is between about 1 bar and about 50 bar, or even higher.

In an embodiment, the structured catalyst is shaped so as to ensure that during operation of the system a peak current density at a point within the structured catalyst is maximum 1000% of the average current density within the structured catalyst, preferably maximum 500% of the average current density, more preferably maximum 300% of the average current density and most preferably maximum 150% of the average current density within the structured catalyst. Hereby, it is ensured that hot spots that may be detrimental to the structured catalyst are avoided. The shaping of the structured catalyst so as to avoid peak current densities above 1000% of the average current density within the structured catalyst may e.g. be the provision of slits and/or cuts within the structured catalyst as described above and in connection with the figures. It should be noted, that even though the current distribution throughout the structured catalyst may be somewhat uneven, as shown in FIG. 6b, the temperature within the walls of the structured catalyst are relative even due to the thermal conductivity of the electrically conductive material of the macroscopic structure. Thus, due to the thermal conductivity of the macroscopic structure, it is not detrimental to the operation of the system, if some parts of the macroscopic structure has a somewhat lower current density.

When performing the steam reforming reaction, $CH_4 + H_2O \rightleftarrows CO + 3H_2$, at a relatively low pressure, such as 5 bar, the required maximum temperature would be between about 800° C. and about 900° C. In more general terms, steam reforming of hydrocarbons may be described as: $C_nH_m + (n/2)H_2O \rightleftarrows nCO + (m/2+n/2)H_2$, the required maximum temperature would typically be between about 750° C. and about 1050° C., whilst the pressure would be between 1 and 50 bar. For higher hydrocarbons, where n≥2, the required maximum temperature would typically be about 400° C. to about 1050° C. The reverse water gas shift reaction, $CO_2 + H_2 \rightleftarrows CO + H_2O$, typically requires a high maximum temperature to push the equilibrium towards CO and consequently the temperature should be between about 600° C. and about 1050° C. at a pressure between 1 and 50 bar. Thus, preferred temperature sub-ranges of the given temperature range T are the range between about 750° C. and about 1050° C., the range between about 800° C. and about 950° C., or the range between about 600° C. and about 1050° C. However, other sub-ranges of the range from about 400° C. to about 1050° C. are conceivable depending on which reaction is to be carried out in the reactor unit.

Examples of a hydrocarbon gas are natural gas, town gas, methane, or a mixture of methane and higher hydrocarbons. According to an embodiment, an inlet temperature of the hydrocarbon feed gas entering the reactor unit is in the range from about 200° C. and about 600° C., and an outlet temperature of a product gas exiting the reactor unit is in the range from about 700° C. and about 1050° C.

In order to control the temperature of a reaction, the heat added/removed from a reactor unit needs to be balanced against the heat consumed/produced by the chemical reaction. The addition/removal of heat needs to be balanced against the rate of reaction and especially the approach to equilibrium as defined by β, where is the ratio between the reaction quotient and the equilibrium constant of a reaction where a value approaching 1 means the reaction mixture is close to equilibrium and values approaching 0 mean that the reaction mixture is far from equilibrium. In general, it is desirable to have as high a rate of reaction as possible, which is achieved at a low β, as long as the temperature can be sufficiently controlled in parallel by balancing the energy added.

In the case of the endothermic steam methane reforming reaction, heat needs to be added to the reaction to ensure that the reaction continues to proceed. Otherwise the reaction will be equilibrated and the value will approach 1 and the reaction will slow down. However, on the other side it is undesirable if the temperature increases faster than the rate of reaction can follow as exposing unconverted hydrocarbons to high temperatures can result in a thermodynamic carbon formation from the actual gas. A good way to follow this behavior is by the approach to equilibrium. The approach to equilibrium of the steam reforming reaction is found by initially calculating the reaction quotient (Q) of the given gas as:

$$Q = \frac{y_{CO} \cdot y_{H_2}^3}{y_{CH_4} \cdot y_{H_2O}} \cdot P^2$$

Here $y_j$ is the molar fraction of compound j, and P is the total pressure in bar. This is used to determine the equilibrium temperature ($T_{eq}$) at which the given reaction quotient is equal to the equilibrium constant:

$$Q = K_{SMR}(T_{eq})$$

where $K_{SMR}$ is the thermodynamic equilibrium constant of the steam methane reforming reaction. The approach to equilibrium of the steam methane reforming ($\Delta T_{app,SMR}$) reaction is then defined as:

$$\Delta T_{app,SMR} = T - T_{eq}$$

Where T is the bulk temperature of the gas surrounding the catalyst material used.

To ensure good performance of a steam reforming catalyst, it is desirable that the catalyst continuously works towards decreasing $\Delta T_{app,SMR}$. Classically, large scale industrial reformers have been designed to obtain an approach to equilibrium of 5-20° C. at the outlet of the reactor.

With the current invention it is possible to control the heat flux and match this directly to the kinetic performance of the catalyst material, as these are disconnected to some extent.

SHORT DESCRIPTION OF THE FIGURES

The invention is illustrated by way of the following Figures:

FIG. 6a shows an embodiment of a structured catalyst for use in the reactor unit of the system of the invention;

FIG. 6b shows the current density profile of the structured catalyst shown in FIG. 6a as a function of the electrical effect transferred to the structured catalyst;

DETAILED DESCRIPTION OF THE FIGURES

Figure 1:
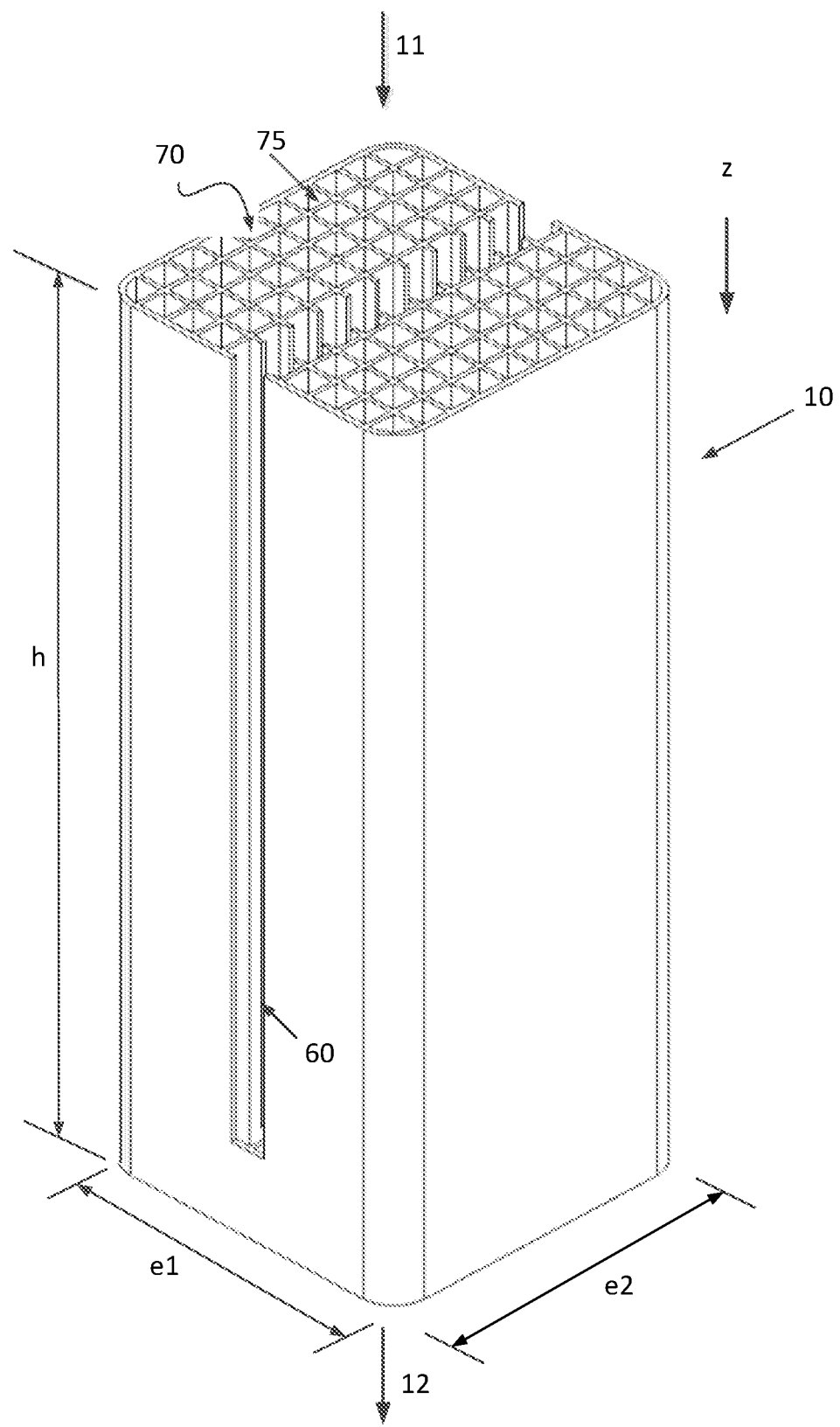
FIG. 1 shows the structured catalyst according to the invention in a perspective view.

FIG. 1 shows the structured catalyst 10 according to the invention in a perspective view. The structured catalyst 10 comprises a macroscopic structure that is coated with a ceramic coating impregnated with catalytically active material. Within the structured catalyst 10 are channels 70 extending along the longitudinal direction (shown by the arrow indicate 'h' in FIG. 1) of the macroscopic structure 10; the channels are defined by walls 75. In the embodiment shown in FIG. 1, the walls 75 define an array of square channels 70 when seen from the direction of flow as indicated by the arrow 12. The structured catalyst 10 has a substantially square perimeter when seen from above, defined by the edge lengths e1 and e2.

The walls 75 of the structured catalyst are of extruded or 3D printed material coated with a ceramic coating, e.g. an oxide, which has been coated onto the macroscopic structure 10. In the Figures, the ceramic coating is not shown. Therefore, during the description of the Figures, a reference to the structured catalyst may be a reference to the macroscopic structure and vice versa, if it is not otherwise indicated. The ceramic coating is impregnated with catalytically active material. Thus, during use in a system for steam methane reforming, a hydrocarbon feed gas flows through the channels 70 and interacts with the heated surface of the structured catalyst and with the catalytically active material supported by the ceramic coating. In the structured catalyst 10 shown in FIG. 1 a slit 60 has been cut into the structured catalyst 10. This slit 60 can be used to force a current to take a zig-zag route within the macroscopic structure 10 thereby increasing the current path and thus the heat dissipated within the macroscopic structure 10. The slit 60 within the structured catalyst 10 may be provided with embedded insulating material in order to ensure that no current flows in the transverse direction of the slit 60, but the coat alone may also be considered as providing sufficient electrical insulation between the two parts of the macroscopic structure.

The channels 70 in the structured catalyst 10 are open in both ends. In use of the structured catalyst in a reactor unit, a hydrocarbon feed gas flows through the unit, in the direction shown by arrows 11 and 12 in FIG. 1, and gets heated via contact with the walls 75 of the channels 70 and by heat radiation, conduction and convection. The heat drives the desired steam methane reforming process. The walls 75 of the channels 70 may e.g. have a thickness of 0.5 mm, and the ceramic coating coated onto the walls may e.g. have a thickness of 0.1 mm. Even though the arrows 11 and 12 indicates that the flow of the hydrocarbon feed gas is down-flow, the opposite flow direction, viz. an up-flow, is also conceivable.

Figure 2:
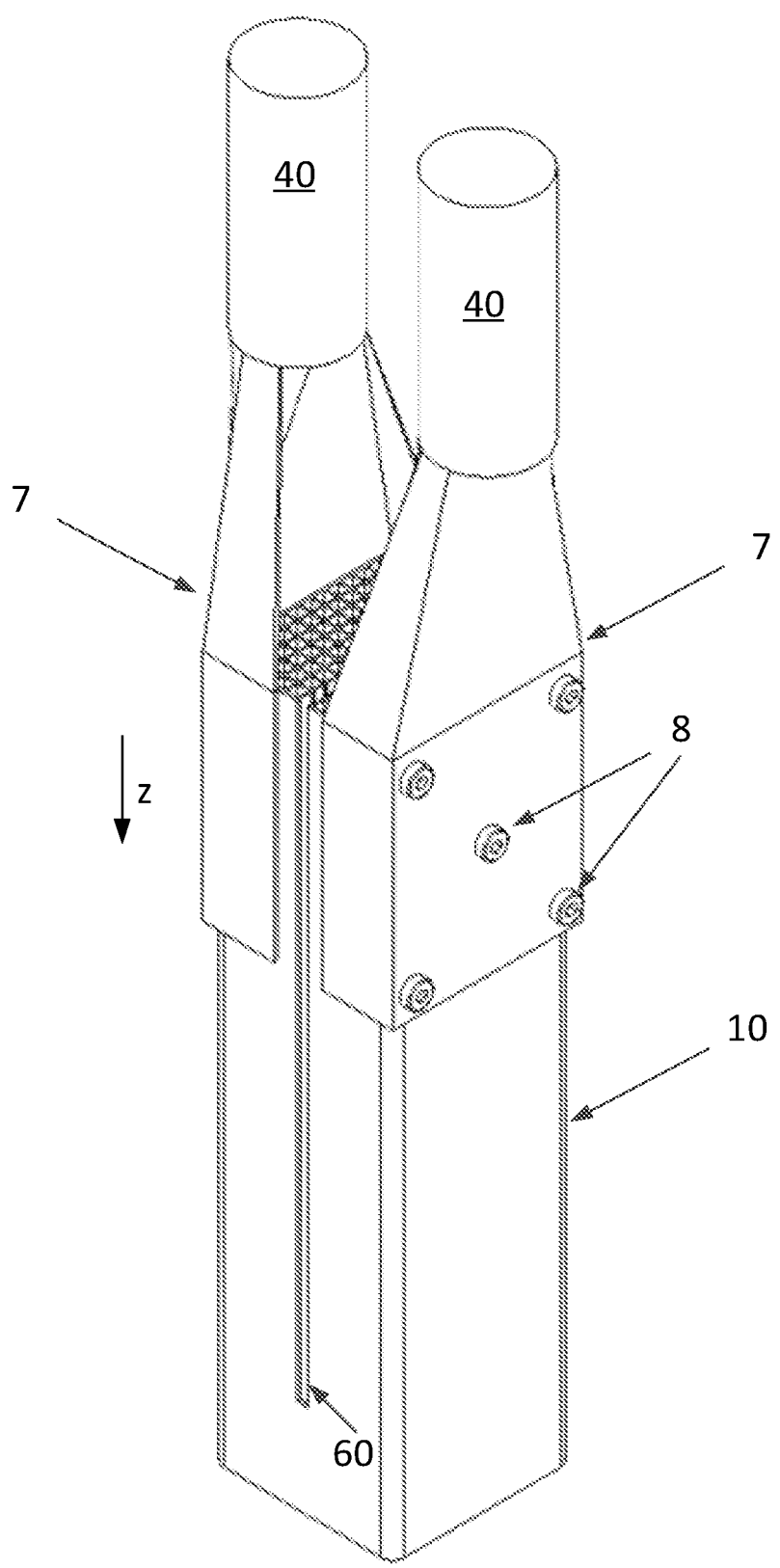
FIG. 2 shows the structured catalyst of FIG. 1 in a perspective view and with connectors attached.

FIG. 2 shows the structured catalyst 10 of FIG. 1 in a perspective view and with connectors 7 attached. The connectors 7 each connects a part of the structured catalyst 10 to a conductor 40. The conductors 40 are both connected to a power supply (not shown). Each of the connectors 7 are connected to an upper part of the structured catalyst. When the conductors 40 are connected to a power supply, an electrical current runs to the corresponding connector 7 via the conductor and runs through the structured catalyst 10. The slit 60 hinders the current flow in a transverse direction (horizontal direction of FIG. 2) throughout its lengths along the height h of the structured catalyst 10. Therefore, the current runs in a direction downwards as seen in FIG. 2 in the part of the structured catalyst 10 along the slit 60, subsequently it runs transversely to the longitudinal direction below the slit 60 as seen in FIG. 2 and finally the current runs upwards in the longitudinal direction of the structured catalyst 10 to the other connector 7. The connectors 7 in FIG. 2 are mechanically fastened to the structured catalyst by means such as screws and bolts. However, additional or alternative fastening means are conceivable. In an embodiment, the electrical power supply generates a voltage of 3V and a current of 400 A. In another embodiment the electrical power supply generates a voltage of 1 V and a current of 200 A.

The connectors 7 are e.g. made in materials like iron, aluminum, nickel, cupper or alloys thereof.

As mentioned, the structured catalyst 10 is coated with a ceramic coating supporting the catalytically active material. However, the parts of the structured catalyst 10 which are connected to the connectors 7 should not be coated with a ceramic coating. Instead, the macroscopic support of the structured catalyst 10 should be exposed or connected directly to the connectors 7 in order to obtain a good electrical connection between the macroscopic structure and the connector. Processing by e.g. polishing of the interface between the macroscopic structure and the connector may advantageously be done during assembly.

When the connectors 7 and thus the conductors 40 are connected to the same end of the structured catalyst 10, viz. the upper end as seen in FIG. 2, the gas entering into a reactor unit housing the structured catalyst 10 would be able to cool the connectors 7 and the conductors 40. For instance, the hydrocarbon gas entering into such a reactor unit could have a temperature of 400° C. or 500° C. and would thus keep the connectors 7 and conductors 40 from reaching temperatures much higher than this temperature.

Figure 3:
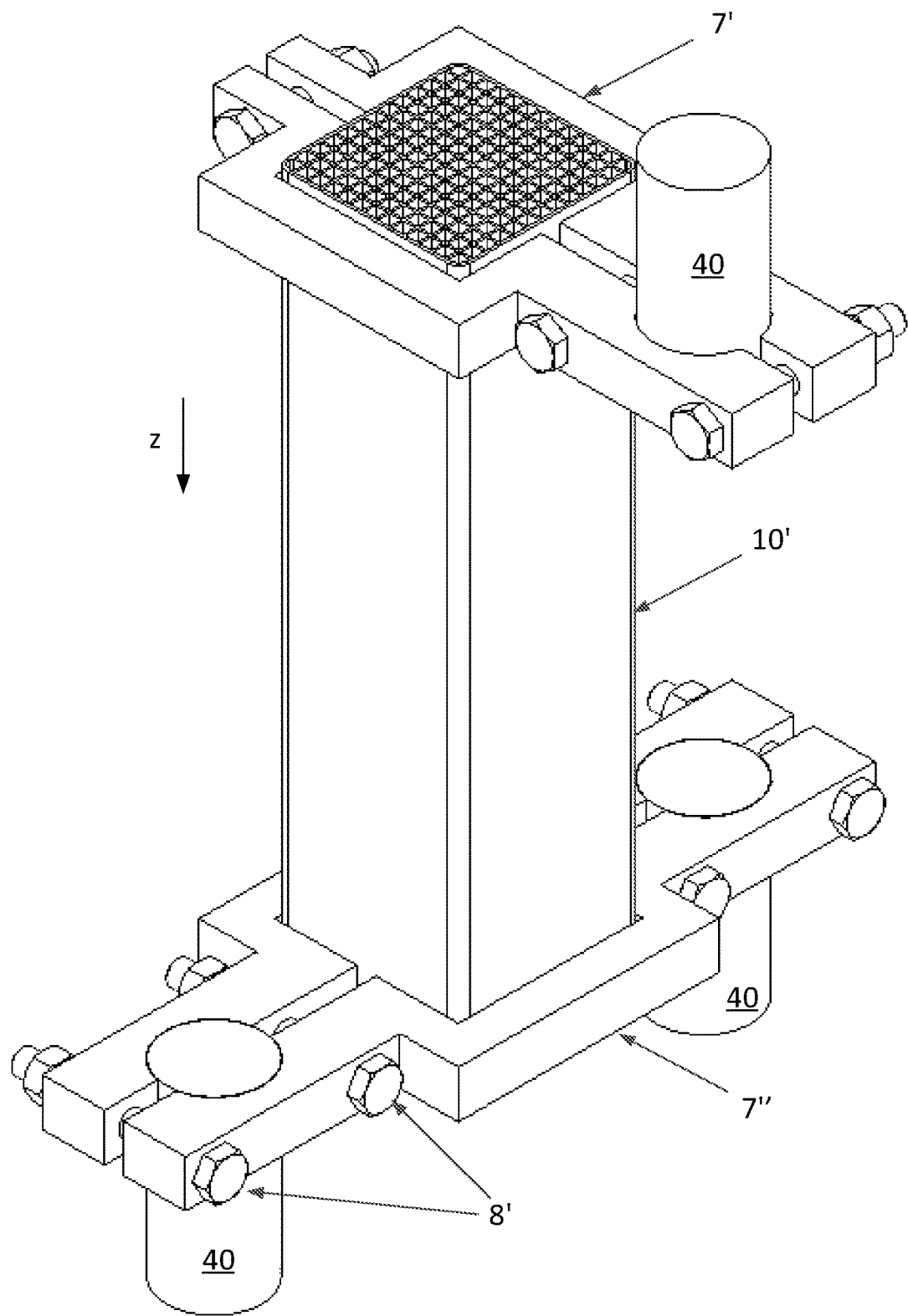
FIG. 3 shows an alternative embodiment of the structured catalyst with connectors attached.

FIG. 3 shows an alternative embodiment of the structured catalyst 10' with connectors 7' attached.

The structured catalyst 10' shown in FIG. 3 has a square or rectangular cross section, like the structured catalyst 10 shown in FIGS. 1 and 2; however, the structured catalyst 10' of FIG. 3 does not have any slit cut through it. In the upper and lower ends of the macroscopic structure 10' are positioned a conductor 40. The material of the conductor 40 is e.g. nickel. Alternatively, other appropriate metals could be used as electrical current distributors, or alloys such as FeCrAlloy. Connectors 7' in the form of electrical conducting bars are used for guiding the current across the structured catalyst 10, i.e. the macroscopic structure. The connectors 7' are fastened to the conductors 40 and to the structured catalyst 10' by use of mechanical fastening means; however, alternative or additional fastening means are also conceivable.

Connectors 7" at the lower end of the structured catalyst 10' may be made of a different material compared to the connectors 7' at the upper end of the structured catalyst 10' as seen in FIG. 3. For example, the connectors 7' may be of cupper, whilst the connectors 7" may be of nickel. Since nickel has a lower conductivity than cupper, the connectors 7" are larger than the connectors 7'.

The embodiment shown in FIG. 3 is suitable for temperatures below 800° C., such as 600-700° C.

Figure 4:
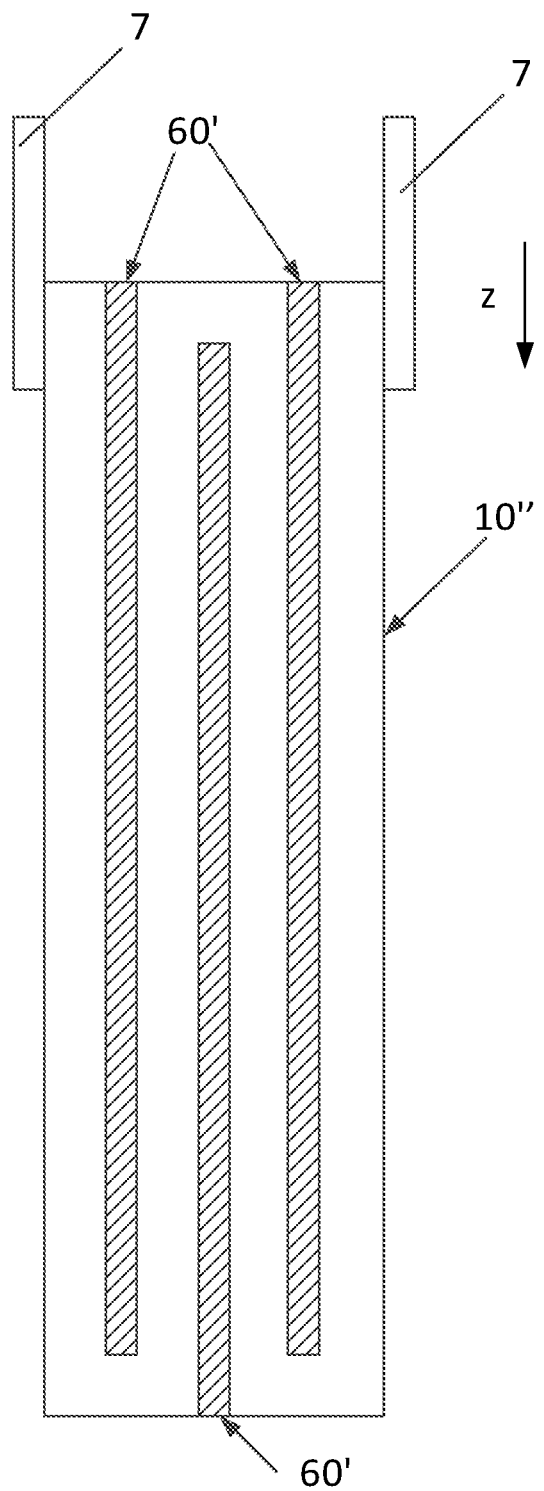
FIG. 4 is a schematic drawing of a cross-section through structured catalyst with electrically insulating parts.

FIG. 4 is a schematic drawing of a cross-section through a structured catalyst 10" of the invention, with electrically insulating parts 60'. The electrically insulating parts are shown as hatched parts in FIG. 4. In the embodiment shown in FIG. 4, three pieces of electrically insulating parts 60' intersects the structured catalyst 10" in most of the longitudinal direction thereof. Conductors 7 are connected to the upper side of the structured catalyst 10" as seen in FIG. 4. During use of the structured catalyst 10", the conductors 7 are connected to a power supply and a hydrocarbon feed gas is brought into contact with the structured catalyst 10". Thus, current runs from the first conductor through the structured catalyst 10" in a zigzag direction, viz. downwards from the first conductor and around the lower side of the first electrically insulating part 60', subsequently upwards and around the upper side of the middle electrically insulating part 60', then downwards again and around the lower side of the third electrically insulating part 60' and finally upwards to the second conductor 7. It should be noted that any appropriate number of electrically insulating parts 60' is conceivable. The electrically insulating parts 60' are solid, electrically insulating material, e.g. glass, and they are provided in cuts or slits in the macroscopic structure. The electrically insulating parts 60' ensures that the parts of the macroscopic structure on the sides electrically insulating parts 60' are kept from each other. It should be noted, that in this embodiment, as in all the embodiments of the invention, the direction of flow of gas may be the same as the direction of the current through the structured catalyst, or it may be different.

In the embodiment of FIG. 4, the direction of flow of gas is e.g. from the upper side of the structured catalyst 10" towards the bottom of the structured catalyst 10"; thus, the flow of current only the same as the direction of the flow of gas as some parts of the structured catalyst 10", whilst the direction of the current is transverse to the direction of the flow of gas at some parts and opposite (upwards) in some parts.

Figure 5:
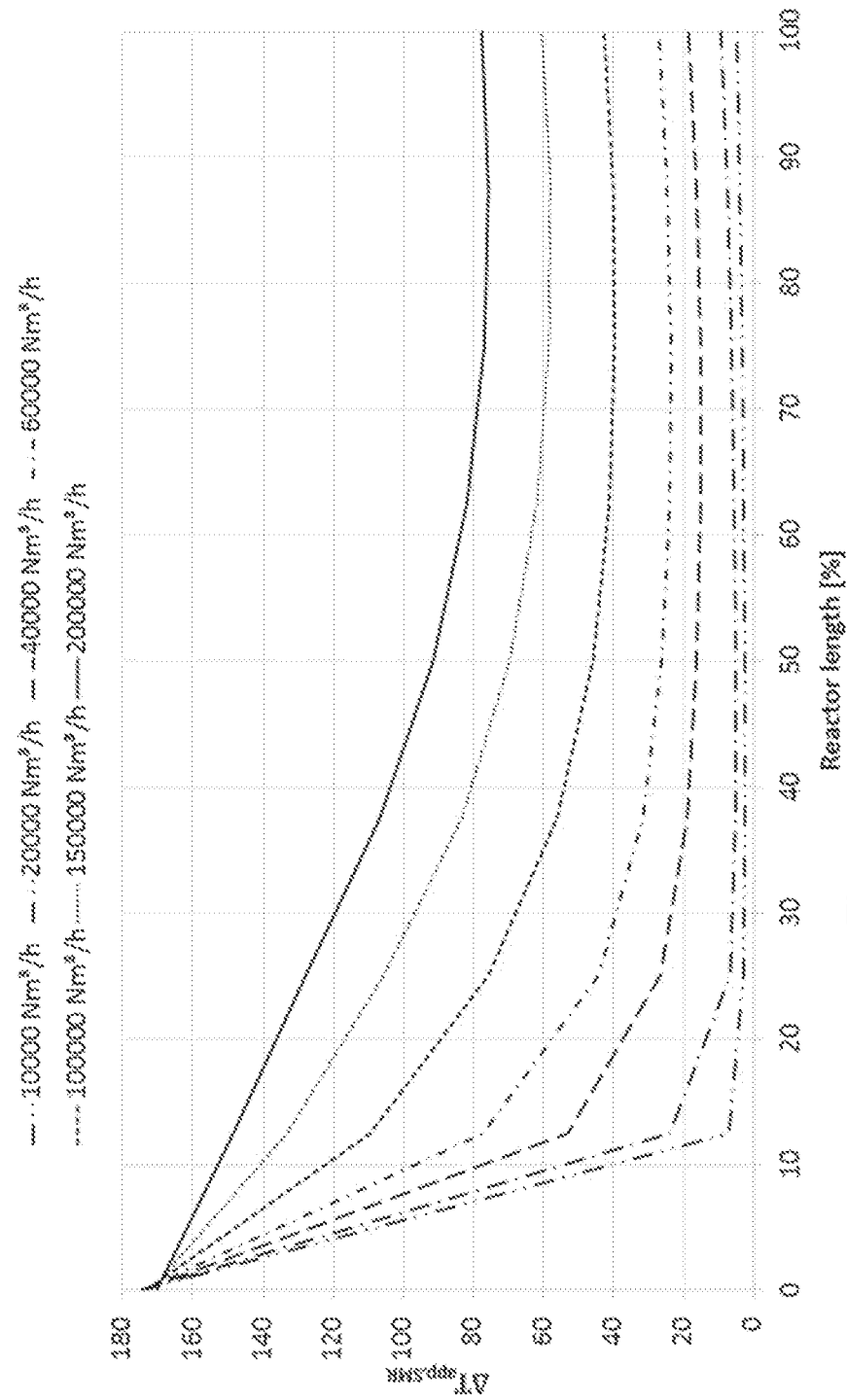
FIG. 5 is a graph of the approach to equilibrium ($\Delta T_{app, SMR}$) of the steam methane reforming reaction for different gas flow rates over the structured catalyst.

FIG. 5 is a graph of the approach to equilibrium ($\Delta T_{app,SMR}$) of the steam methane reforming reaction for different gas flow rates over the structured catalyst.

FIG. 5 shows that for a given gas flow rate over the structured catalyst, the approach to equilibrium at the entry into a reactor unit housing the structured catalyst, the approach to equilibrium is in the range 160-175° C. When the hydrocarbon gas flows over the structured catalyst, the approach to equilibrium is reduced. FIG. 5 shows the approach to equilibrium ($\Delta T_{app,SMR}$ for gas flow rates from 10000 Nm$^3$/h to 200000 Nm$^3$/h. For the lowest gas flow rate, 10000 Nm$^3$/h, the approach to equilibrium becomes less than 10° C. at about 13% of the reactor length. Here, the reactor length is seen as the current path length along the structured catalyst, so that the total reactor length of the structured catalyst 10 shown in FIG. 1 is about 2 h. For higher gas flow rates, the approach to equilibrium is higher the higher the gas flow rate, so that for a gas flow rate of 200000 Nm$^3$/h, the approach to equilibrium reaches a minimum value just below 80° C.

A general trend in all the curves in the FIG. 5 is that the approach to equilibrium is continuously decreasing from the entry into the structured catalyst until a pseudo equilibrium is reached, where the heat added and the heat consumed roughly equal each other. The approach to equilibrium from this stage is substantially constant or has a slightly increasing development due to the overall increasing temperature of the reactor unit. For e.g. the flow rate 150000 Nm$^3$/h, the approach to equilibrium goes below 60° C. at about 80% of the reactor length, but subsequently increases to about 60° C.

FIG. 6a shows an embodiment of a structured catalyst 10" for use in the reactor unit of the system of the invention. FIG. 6a shows the structured catalyst 10" in a perspective view. It can be seen that the structured catalyst 10" has a single vertical slit 60 along the longitudinal axis of the catalyst 10" as shown in FIG. 6a. The single vertical slit 60 extends from the top of the structured catalyst 10" towards the bottom thereof, along about 90% of the length of the structured catalyst. The single vertical slit 60 can be seen as parting the structured catalyst 10" into two halves. Each of these two halves has five horizontal slits 65. The vertical slit 60 and the horizontal slits 65 function to direct the current in a zig-zag route through the structured catalyst.

FIG. 6b shows the current density of the structured catalyst 10" shown in FIG. 6a as a function of the electrical effect transferred to the structured catalyst 10". FIG. 6b is the result of a multiphysics computational fluid dynamics simulations in Comsol software of the current distribution of the structure in FIG. 6a. In FIG. 6b the structured catalyst 10" is seen from the side. Two electrodes (not shown in FIG. 6b) are connected to the upper end on the left side of the structured catalyst 10". As illustrated by the intensity of the current density, as depicted on the scale in the right part of FIG. 6b, when a power source is connected to the structured catalyst 10", a current runs from the upper end thereof in zig-zag form, due to the horizontal slits, to the bottom of the structure catalyst 10", to the back thereof, viz. into the paper as seen in FIG. 6b, and subsequently upwards in zig-zag form towards the second electrode. The temperature of the structured catalyst 10" depends upon the current density throughout the structured catalyst 10". It can be seen in FIG. 6b, that the current density is highest at the end points of horizontal slits 65 into the structured catalyst 10". These points are the points where the current path turns direction, i.e. where the current through the structured catalyst 10" is forced or directed in another direction. Moreover, it can be deduced that the current density vector of the principal current path has a non-zero component value parallel to the length of said structured catalyst for more than 80% of the structure. In conclusion, it is clear from FIG. 6b that the principal current path can be controlled in the structured catalyst. This feature gives control of the temperature profile inside the structured catalyst.

It should be noted, that even though the structured catalysts shown in the figures are shown as having channels with a square cross section, as seen perpendicular to the z-axis, any appropriate shape of the cross sections of the channels is conceivable. Thus, the channels of the structured catalyst could alternatively be e.g. triangular, hexagonal, octagonal, or circular, where triangular, square, and hexagonal shapes are preferred.

Figure 7A:
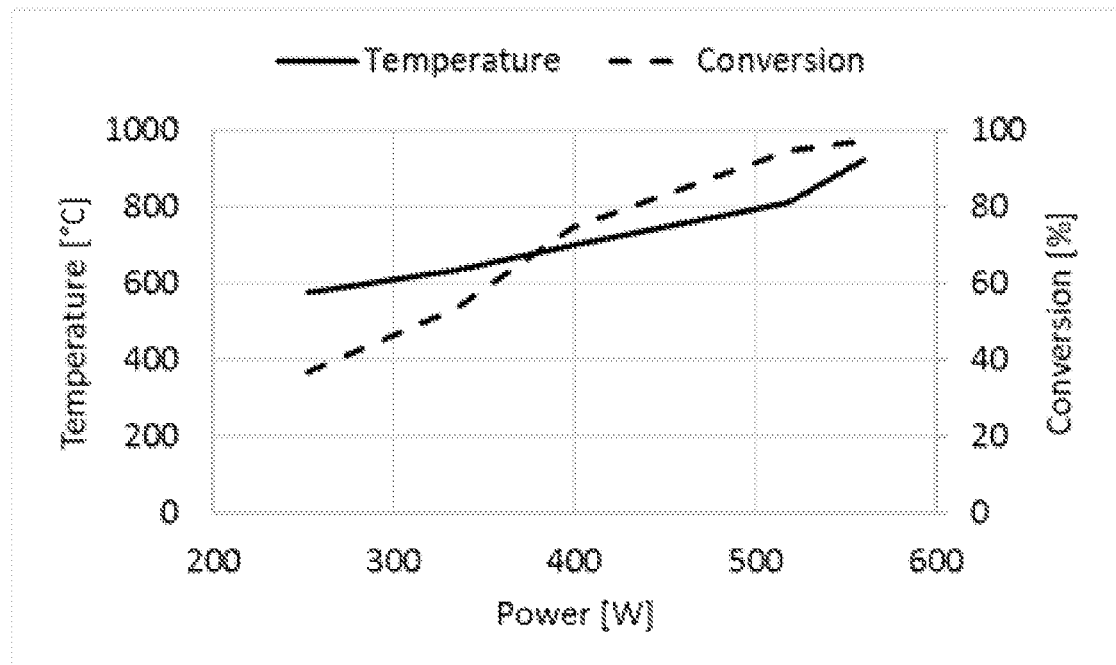
FIGS. 7a and 7b show temperature and conversion profiles as a function of electrical effect transferred to the structured catalyst.
Figure 7B:
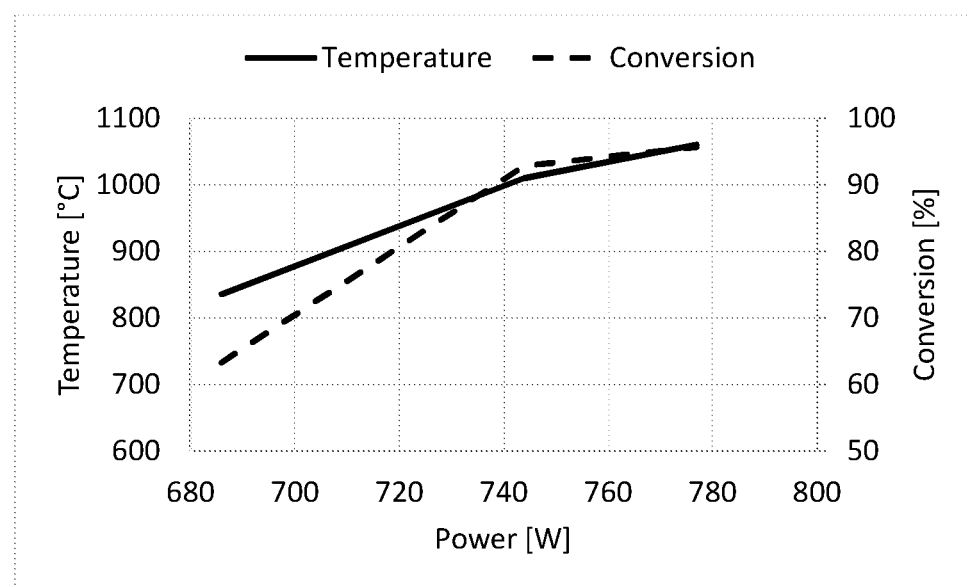

FIGS. 7a and 7b shows temperature and conversion profiles as a function of electrical effect transferred to the structured catalyst. FIG. 7a is the result of a laboratory test of bench scale system having a length of 12 cm and a volume 108 cm$^3$ of the structured catalyst as defined by the outer walls/sides thereof and configuration as depicted in FIG. 1 where Cu conductors has been welded to the first 2 cm of the monolith on opposing sides in the first end. The pressure of the pressure shell was 3.5 bar, the temperature of the feed gas inlet into the reactor unit of the system was about 200° C. The composition of the feed gas was 31.8% $CH_4$, 2.4% $H_2$, 65.8% $H_2O$ and the total gas flow was 102.2 Nl/h. It should be noted, that the energy balance is substantially better in a larger scale than in the small scale experimental conditions behind the graphs of FIG. 7a, due to high energy loss in this relative small scale. However, it is clear from FIG. 7a that with increasing power, both the conversion of methane and the temperature increases. The temperature reaches above 900° C. and the methane conversion reaches above 98%.

FIG. 7b shows a similar experiment as described above, but with a pressure of 21 bar. Again, it is clear from FIG. 7b that with increasing power, both the conversion of methane and the temperature increases. The temperature reaches above 1060° C. and the methane conversion reaches above 95%.

Figure 8A:
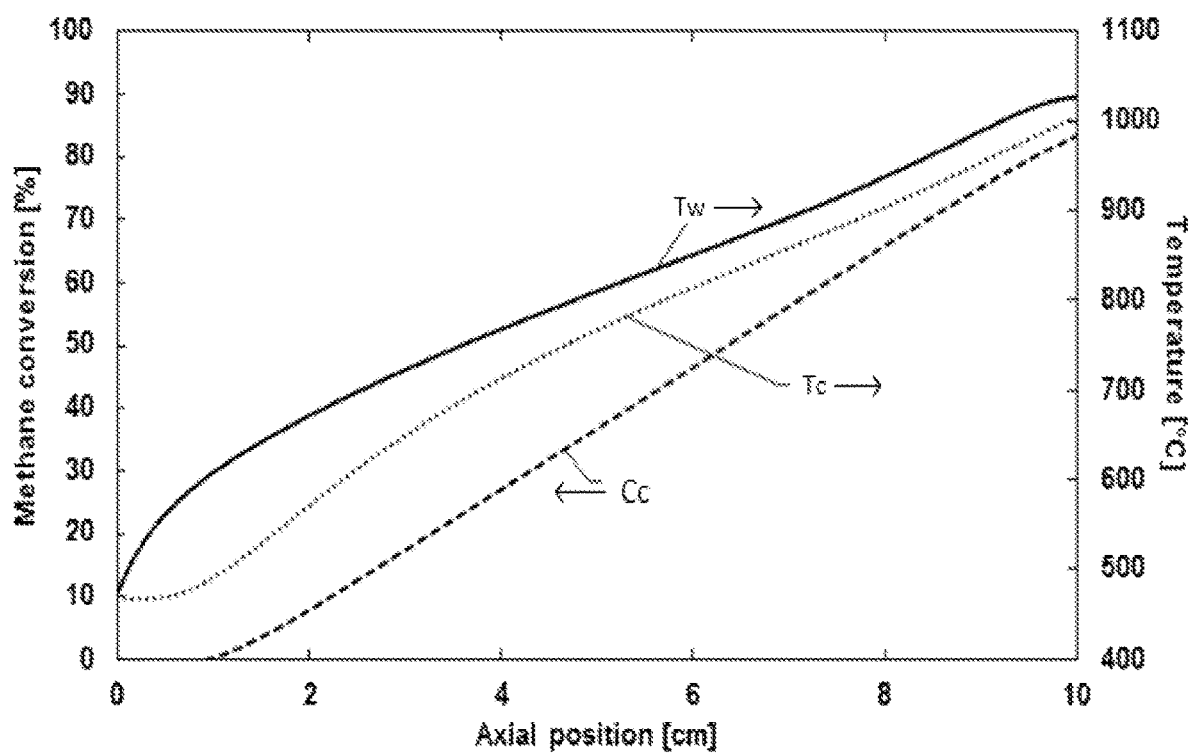
FIGS. 8a and 8b show simulation results for temperatures and gas composition along the length of structured catalyst.
Figure 8B:
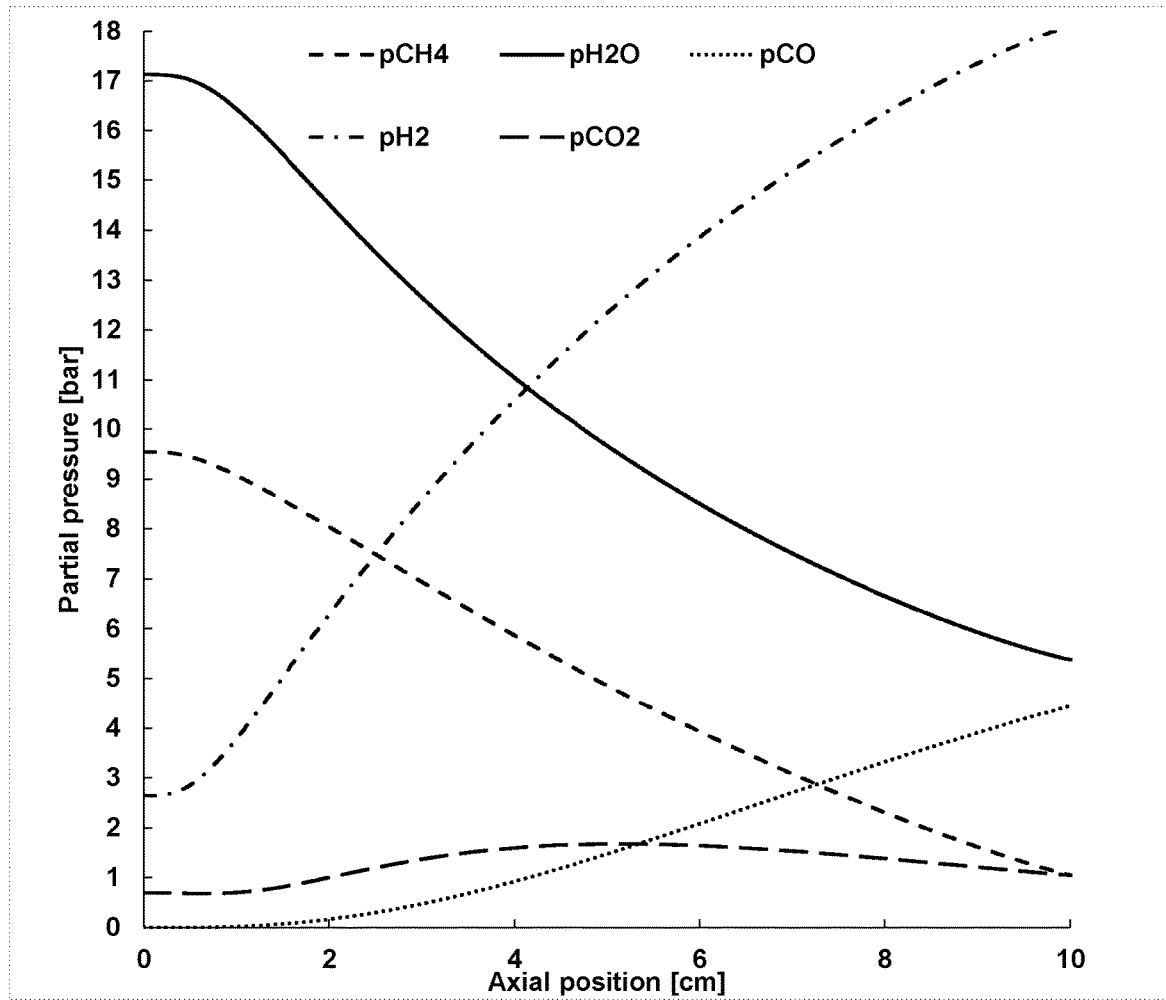

FIGS. 8a and 8b show simulation results for temperatures and gas composition along the length of structured catalyst. A single channel of a structured catalyst is simulated. The length of the structured catalyst of this simulation, and thus of the single channel, is 10 cm. The conditions within the pressure shell/structured catalyst/channel is:
Pressure: 29 barg
T inlet: 466° C.
Total flow: 30 Nl/h
Composition of the feed gas inlet into the reactor/channel:
31.8% methane, 8.8% hydrogen, 2.3% carbon dioxide, and 57.1% steam.

In FIG. 8a, the temperature of the wall of the channel is indicated by Tw and the temperature in the center of the channel is indicated by Tc. Tw and Tc are read from the scale to the right of the graphs. The methane conversion is indicated by Cc and is read from the scale to the left of the graphs.

From FIG. 8a it is seen that the temperature of the wall of a channel in the structured catalyst increases continuously along almost all of the length of the structured catalyst. The temperature is about 480° C. at the first end of the structured catalyst (z=0 cm) and about 1020° C. at the second end of the structured catalyst (z=10 cm). The increase of temperature is steepest the first 10% of the structured catalyst, and only in the last few percent of the length of the structured catalyst, the temperature does not change much. Thus, when the current turns around at the second end of the structured catalyst, from going downwards to upwards in the FIG. 1a, the temperature of the walls of the channels of the structured catalyst does not change substantially for increasing z-values. However, FIG. 8a also shows that the temperature in the center of the channel keeps on increasing along the whole length of the structured catalyst. It should be noted, though, that the temperature in the center of the channel remains substantially constant for the first 5-7% of the length of the structured catalyst. This is due to the fact that the gas inlet into the structured catalyst cools the structured catalyst in the vicinity of the first end thereof and due to thermal energy transport delay from the wall to the center of the channel.

In FIG. 8a, the conversion of methane in the center of the channel of the structured catalyst is also shown. It can be seen that the conversion is close to zero for the first 10-12% of the length of the channel, and that the conversion subsequently increases monotonously and reaches a value of about 85%. As noted above, small scale reactors and simulations thereof provide for less than optimal numbers, and that considerably higher conversion is achievable in a real scale system. However, the simulation provides information on the tendencies of the conversion rate and temperature throughout the structured catalyst.

FIG. 8b shows the partial pressures of the principle active gasses within the channel of the structured catalyst of FIG. 8a. From FIG. 8b, it is clear that the partial pressures of steam and methane diminish considerably along the length of the channel of the structured catalyst, whilst the partial pressures of hydrogen and carbon monoxide increase considerably. Moreover, the partial pressure of carbon dioxide increases slightly along the length of the structured catalyst, but decreases towards the highest temperatures where the reverse water gas shift reaction is thermodynamically favored.

Example 1

As noted above, a general advantage of carrying out steam reforming of hydrocarbons using resistance heating as compared to the present side fired reformers or top fired reformers, is that such fired reformers are limited in the hot part by the heat transfer rate to the catalytic zone. By use of resistance heating, this heat transfer limitation can be circumvented since the structured catalyst itself is heated directly by the electrical current running in the macroscopic structure.

The steam reforming reaction generate i.a. hydrogen and/or synthesis gas from a hydrocarbon gas. Synthesis gas is a gas mixture comprising hydrogen, carbon monoxide, and often also carbon dioxide. Today, the decentralized market for hydrogen is often dependent on expensive distribution and storage of hydrogen. As an alternative to this, resistance heated reforming could be envisioned as a small scale hydrogen production technology potentially with fast startup for ad hoc hydrogen production and a heating system based on electricity instead of a fired hot box.

The structured catalyst for the steam reforming reaction, $CH_4 + H_2O \rightleftarrows CO + 3H_2$, at a temperature within the temperature range from about 700° C. to about 950° C. or even 1050° C. is for example a macroscopic structure of FeCrAlloy alloy coated with a $ZrAlMgO_x$ based coat and impregnating with Ni as active phase.

Hydrogen production can be facilitated at 860° C. and 5 bar with a steam to hydrocarbon carbon ratio of 2 using this structured catalyst for the reaction. The heat for the reaction is supplied by a current running in the macroscopic structure.

Reforming of Higher Hydrocarbons:

Steam reforming of higher hydrocarbons may also take place: $C_nH_m + (n/2)H_2O \rightleftarrows nCO + (m/2+n/2)H_2$, where $n \geq 2$. This reaction may take place at a temperature within the range from about 400° C. to about 950° C.

A suitable structured catalyst is for example a macroscopic structure of FeCrAlloy alloy coated with a $ZrAlMgO_x$ based coat and impregnating with nickel as active phase.

Example 2

An example calculation of the process of the invention is given in Table 1 below. A hydrocarbon feed gas comprising i.a. a hydrocarbon gas, hydrogen and steam is fed to the structured catalyst of the invention. The feed stream is pressurized to a pressure of 28 kg/cm²·g and has a temperature of 500° C. The structured catalyst is in the form of 1 macroscopic structure having a square cross section, which has a size of 0.4 times 0.4 times 0.35 meter. The structured catalyst has 10000 channels with a square cross section having a side or edge length of 0.32 cm. The structured catalyst has slits parallel to the longitudinal direction thereof, so that clusters of 5 times 5 channels are formed. The clusters are individually insulated from the neighboring cluster, except from the ends, so that the current path through the macroscopic structure is a zig-zag formed path. A current of 200 A and a voltage of ca. 500 V are applied to the structured catalyst of the invention in order to heat the macroscopic structure and thus the gas passing over the macroscopic structure, corresponding to a power deposited in the macroscopic structure of 99 kW.

During the passage of the feed gas through the structured catalyst, the feed gas is heated by the structured catalyst and undergoes steam methane reforming to a product gas having an exit temperature of 963° C.

TABLE 1

| Structured catalyst size: | |
| --- | --- |
| Edge size (e1 = e2) [m] | 0.4 |
| Height h [m] | 0.35 |
| Total volume [L] | 55.4 |

| | Feed gas | Product gas |
| --- | --- | --- |
| T [° C.] | 500 | 963 |
| P [kg/cm² g] | 27.97 | 27.47 |
| $CO_2$ [Nm³/h] | 1.7 | 7.3 |
| $N_2$ [Nm³/h] | 0.3 | 0.3 |
| $CH_4$ [Nm³/h] | 26.3 | 1.6 |
| $H_2$ [Nm³/h] | 5.9 | 85.4 |
| CO [Nm³/h] | 0 | 19.1 |
| $H_2O$ [Nm³/h] | 80.5 | 50.2 |
| Total flow [Nm³/h] | 114.7 | 163.9 |
| Power [kW] | | 99 |

Example 3

Example 6 relates to a reactor unit comprising a structured catalyst in the form of a macroscopic structure having in total 78540 channels with a total wall length of one channel in the cross section of 0.00628 m each and a length of 2 m, giving a total surface area of 987 m² of catalyst surface. For a reactor unit with this macroscopic structure, a simulation with varying gas flow over the macroscopic structure was made where the gas composition in all calculations was 8.8% $H_2$, 56.8% $H_2O$, 0.2% $N_2$, 0.1% CO, 2.3% $CO_2$, and 31.8% $CH_4$. In each simulation a kinetic model for steam methane reforming and water gas shift was used and a variation in the surface flux (Q) of energy from the electrically heated macroscopic structure was made to adjust the exit temperature of the product gas from the reactor unit housing the macroscopic structure to 920° C. FIG. 5 shows the approach to equilibrium along the reactor length at varying total gas flow rates. The Figure shows that at low feed flows (10000 Nm³/h), the approach to the equilibrium at the outlet of the reactor unit is below 5° C., which translate into a hydrocarbon conversion of 77%, while at the high flows (150000 Nm³/h) the approach to equilibrium is above 60° C., which correspond to a hydrocarbon conversion of only 64%, and the hydrocarbons therefore are used less efficiently. The close control of the heat flux in the current invention therefore allows for controlling the approach to equilibrium closely along the length of the reactor unit.

The invention claimed is:

1. A structured catalyst for catalyzing steam methane reforming reaction in a given temperature range T upon bringing a hydrocarbon feed gas into contact with said structured catalyst, said structured catalyst comprising a macroscopic structure, said macroscopic structure comprising an electrically conductive material, said macroscopic structure having a resistivity between $10^{-5}$ Ω-m and $10^{-7}$ Ω-m in the given temperature range T, and said macroscopic structure supporting a ceramic coating, wherein the macroscopic structure has been manufactured by extrusion or 3D printing and by subsequent sintering, wherein said macroscopic structure and said ceramic coating have been sintered in an oxidizing atmosphere in order to form chemical bonds between said ceramic coating and said macroscopic structure, wherein said ceramic coating supports catalytically active material, said catalytically active material being arranged to catalyze the steam methane reforming reaction, wherein the macroscopic structure is arranged to conduct an electrical current to supply an energy flux to the steam methane reforming reaction.

2. A structured catalyst according to claim 1, wherein the macroscopic structure comprises a plurality of near-parallel or parallel channels.

3. A structured catalyst according to claim 1, wherein the catalytically active material are sub-micron sized particles.

4. A structured catalyst according to claim 1, wherein the macroscopic structure has at least one electrically insulating part arranged to increase the principal current path within the macroscopic structure, having a length larger than the largest dimension of the macroscopic structure, and wherein the structured catalyst is configured for use in a system for carrying out a steam methane reforming reaction, in which system the hydrocarbon feed gas enters into the structured catalyst at a first end and a product gas exits the structured catalyst at a second end, said structured catalyst further being configured to have at least two conductors connected to the structured catalyst at a position closer to said first end than to said second end, wherein said structured catalyst is constructed to, during use, direct an electrical current to run from one conductor substantially to said second end along a longitudinal direction of the structured catalyst and return to a second of the at least two conductors along a longitudinal direction of the structured catalyst, wherein the longitudinal direction extends between the first and second ends.

5. A structured catalyst according to claim 1, wherein the resistance and geometry of the material of the macroscopic structure is configured to have a heat generation capacity of 500 to 50000 W/m².

6. A structured catalyst according to claim 1, wherein the structured catalyst comprises two or more macroscopic structures.

7. A method for manufacturing a structured catalyst according to claim 1, said method comprising the steps of:
   a) providing a mixture of powdered metallic particles and a binder,
   b) extruding said mixture to a structure, c) sintering said structure in a non-oxidizing atmosphere at a first temperature $T_1$, where $T_1 > 1000°$ C., thereby providing a macroscopic structure,
d) providing a ceramic coating onto the macroscopic structure,
e) sintering the macroscopic structure and the ceramic coating in an oxidizing atmosphere, at a second temperature $T_2$, where $T_2 > 800°$ C., in order to form chemical bonds between said ceramic coating and said macroscopic structure, and
f) impregnating the ceramic coating with catalytically active material.

8. A method for manufacturing a structured catalyst according to claim 1, said method comprising the steps of:
a) providing a mixture of powdered metallic particles and a binder,
b) extruding said mixture to a structure,
c) sintering said structure in a non-oxidizing atmosphere at a first temperature $T_1$, where $T_1 > 1000°$ C., thereby providing a macroscopic structure,
d) providing a ceramic coating onto the macroscopic structure, wherein the ceramic coating supports catalytically active material, and
e) sintering the macroscopic structure and the ceramic coating in an oxidizing atmosphere, at a second temperature $T_2$, where $T_2 > 800°$ C., in order to form chemical bonds between said ceramic coating and said macroscopic structure.

9. A method for manufacturing a structured catalyst according to claim 1, said method comprising the steps of:
a) 3D printing the macroscopic structure with a metal additive manufacturing melting process,
b) applying a ceramic coating onto the macroscopic structure,
c) sintering the macroscopic structure and the ceramic coating in an oxidizing atmosphere, at a second temperature $T_2$, where $T_2 > 800°$ C., and
d) impregnating the ceramic coating with catalytically active material, thereby providing the structured catalyst.

10. A method for manufacturing a structured catalyst according to claim 1, said method comprising the steps of:
a) 3D printing a metal structure with a binder-based metal additive manufacturing process,
b) sintering said metal structure in a non-oxidizing atmosphere at a first temperature $T_1$, where $T_1 > 1000°$ C., thereby providing said macroscopic structure,
c) applying a ceramic coating onto the macroscopic structure,
d) sintering the macroscopic structure and the ceramic coating in an oxidizing atmosphere, at a second temperature $T_2$, where $T_2 > 800°$ C., and
e) impregnating the ceramic coating with catalytically active material, thereby providing the structured catalyst.

11. A system for carrying out a steam methane reforming reaction in a given temperature range T between about 200° C. and about 1050° C. or a sub-range thereof upon bringing a hydrocarbon feed gas into contact with a structured catalyst according to claim 1, said system comprising:
a reactor unit comprising said structured catalyst and at least two conductors electrically connected to said structured catalyst, and
an electrical power supply arranged for being connected to said structured catalyst via the at least two conductors in order to allow an electrical current to run through said structured catalyst during operation of said system.

12. A system according to claim 11, wherein the connection between the macroscopic structures of said structured catalyst and said at least two conductors is a mechanical connection, a welded connection, a brazed connection, or a combination of said connections.

13. A system according to claim 11, wherein the system comprises a control system arranged to control one or more of the following: the electrical current, the voltage, the heat flux, the space velocity, the temperature, or combinations thereof.

14. A system according to claim 11, wherein the hydrocarbon feed gas enters into the structured catalyst at a first end and wherein a product gas exits the structured catalyst at a second end, wherein said at least two conductors are connected to the structured catalyst at a position closer to said first end than to said second end.

15. A system according to claim 14, wherein said structured catalyst is constructed to direct an electrical current to run from one conductor substantially to said second end of the structured catalyst and return to a second of the at least two conductors.

16. A system according to claim 11, wherein said structured catalyst has at least one electrically insulating part arranged to increase the length of a principal current path between said at least two conductors to a length larger than the largest dimension of the structured catalyst.

17. A system according to claim 11, wherein said structured catalyst has at least one electrically insulating part arranged to direct a current through said structured catalyst in order to ensure that for at least 70% of the length of said structured catalyst, a current density vector of the a principal current path has a non-zero component value parallel to the length of said structured catalyst so that the current is forced from the first end of the structured catalyst towards the second end, and subsequently is forced towards the first end again.

18. A system according to claim 11, wherein said structured catalyst is shaped so as to ensure that during operation of said system a peak current density at a point within the structured catalyst is maximum 1000% of the average current density within the structured catalyst.

19. A structured catalyst according to claim 1, wherein the given temperature range T in which the catalyzing steam methane reforming reaction is to take place during use of the structured catalyst is the range between about 200° C. and about 1050° C. or a sub-range thereof, and wherein the structured catalyst is configured to be heated to temperatures within this temperature range.

20. A structured catalyst according to claim 4, wherein said structured catalyst has at least three electrically insulating parts arranged to direct current to run from the first conductor through the structured catalyst in a zigzag direction to the second conductor.

21. A structured catalyst according to claim 20, wherein said structured catalyst has three electrically insulating parts arranged to direct current to run from the first conductor through the structured catalyst in a zigzag direction, viz. downwards from the first conductor and around the lower side of the first electrically insulating part, subsequently upwards and around the upper side of the middle electrically insulating part, then downwards again and around the lower side of the third electrically insulating part and finally upwards to the second conductor.

22. A structured catalyst according to claim 1, wherein the structured catalyst has a single vertical slit along the longitudinal axis of the catalyst, which single vertical slit extends from the top of the structured catalyst towards the bottom thereof, along about 90% of the length of the structured catalyst so that the single vertical slit can be seen as parting the structured catalyst into two parts, such as two halves, and wherein each of these two parts has a plurality of horizontal slits, such as five horizontal slits, so that the vertical slit and the horizontal slits function to direct the current in a zig-zag route through the structured catalyst.

23. A system according to claim 15, wherein said at least two conductors are connected to the structured catalyst at said first end, and wherein said structured catalyst has at least one electrically insulating part arranged to increase the length of a principal current path between said at least two conductors.

\* \* \* \* \*